(12) United States Patent
Lengyel et al.

(10) Patent No.: US 8,825,190 B2
(45) Date of Patent: Sep. 2, 2014

(54) PRIORITY CALCULATION DEVICE, PROGRAM, PRIORITY CALCULATION SYSTEM, AND PRIORITY CALCULATION METHOD

(75) Inventors: Attila Lengyel, San Jose, CA (US); Yoichi Nonaka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 515 days.

(21) Appl. No.: 13/140,122

(22) PCT Filed: Nov. 4, 2009

(86) PCT No.: PCT/JP2009/068797
§ 371 (c)(1),
(2), (4) Date: Sep. 16, 2011

(87) PCT Pub. No.: WO2010/084656
PCT Pub. Date: Jul. 29, 2010

(65) Prior Publication Data
US 2012/0158167 A1   Jun. 21, 2012

(30) Foreign Application Priority Data
Jan. 26, 2009  (JP) ................................. 2009-013744

(51) Int. Cl.
*G06F 19/00*       (2011.01)
(52) U.S. Cl.
USPC .......................................... 700/101; 700/99
(58) Field of Classification Search
USPC ............... 700/95, 96, 99, 100, 101, 102, 103, 700/106, 107, 121; 705/22, 28
See application file for complete search history.

(56) References Cited

U.S. PATENT DOCUMENTS

| | | | |
|---|---|---|---|
| 5,548,518 A * | 8/1996 | Dietrich et al. | 700/100 |
| 5,818,716 A | 10/1998 | Chin et al. | |
| 7,054,699 B2 * | 5/2006 | Nakamura | 700/95 |
| 7,216,416 B2 * | 5/2007 | Nakamura et al. | 29/564 |
| 7,738,985 B2 * | 6/2010 | Awata | 700/103 |
| 7,835,952 B2 * | 11/2010 | Tozawa et al. | 705/28 |

(Continued)

FOREIGN PATENT DOCUMENTS

| | | |
|---|---|---|
| JP | 6-203042 | 7/1994 |
| JP | 2004-246538 | 9/2004 |

(Continued)

*Primary Examiner* — Charles Kasenge
(74) *Attorney, Agent, or Firm* — Antonelli, Terry, Stout & Kraus, LLP

(57) ABSTRACT

Priority can be calculated for works-in-process which are not in demand. A priority calculation device (110) comprises a priority calculation unit (124) which specifies a queue of lots in each production stage, a product category wherein the lot is to be used, and the number of components included in the lot, on the basis of information stored in a queue information storage area (115), and allocates priority for each lot so that when the specified lot is supplied to the production stage, a lot, by which a ratio of a component, in each product category, contained in a lot which is in a process subsequent to the process of the production stage is made closer to the ratio of demand in each product category specified by the information stored in a demand information storage area (113), is supplied into the production stage with higher priority.

11 Claims, 17 Drawing Sheets

(56) References Cited

U.S. PATENT DOCUMENTS

| | | | |
|---|---|---|---|
| 8,041,441 B2* | 10/2011 | Izumi et al. | 700/101 |
| 2003/0233295 A1* | 12/2003 | Tozawa et al. | 705/28 |
| 2004/0193291 A1 | 9/2004 | Sakai | |
| 2005/0203653 A1* | 9/2005 | Nakamura | 700/99 |
| 2007/0244591 A1* | 10/2007 | Ishibashi et al. | 700/99 |
| 2008/0275584 A1* | 11/2008 | Izumi et al. | 700/101 |
| 2009/0062951 A1* | 3/2009 | Awata | 700/103 |
| 2009/0292381 A1 | 11/2009 | Inoue et al. | |

FOREIGN PATENT DOCUMENTS

| | | |
|---|---|---|
| JP | 2004-295188 | 10/2004 |
| JP | 2007-72924 | 3/2007 |
| JP | 2009-205365 | 9/2009 |

* cited by examiner

| LOT ID | PRODUCT TYPE | PROCESS | QUANTITY |
|---|---|---|---|
| AA1111 | A | P1 | 8 |
| BB1212 | B | P2 | 10 |
| ⋮ | ⋮ | ⋮ | ⋮ |

| LOT ID | CARRY-IN TYPE | PREVIOUS PROCESS | SUBSEQUENT PROCESS | PRODUCT TYPE | QUANTITY |
|---|---|---|---|---|---|
| AA0111 | MOVED BETWEEN PROCESSES | P1 | P2 | A | 20 |
| BB0212 | STOCKED | P2 | P3 | B | 30 |
| ⋮ | ⋮ | ⋮ | ⋮ | ⋮ | ⋮ |

| PROCESS P3 (116b, 116c, 116d) | | |
|---|---|---|
| PRODUCT TYPE | LOT ID | QUANTITY |
| A | AA0011 | 8 |
|   | AA0012 | 5 |
|   | ⋮ | ⋮ |
| B | BB0011 | 10 |
|   | BB0012 | 8 |
|   | ⋮ | ⋮ |
| C | CC0011 | 20 |
|   | CC0012 | 15 |
|   | ⋮ | ⋮ |

| PRODUCT TYPE (117b) | QUANTITY (117c) |
|---|---|
| A | 350 |
| B | 270 |
| C | 300 |

FIG. 14

| PROCESS P1 | | | | |
|---|---|---|---|---|
| PRE-INTRODUCTION EUCLIDEAN DISTANCE | PRODUCT TYPE | LOT ID | POST-INTRODUCTION EUCLIDEAN DISTANCE | IMPROVEMENT AMOUNT |
| 13.96 | A | AA0011 | 14.06 | -0.10 |
| | | AA0012 | 14.10 | -0.14 |
| | | ⋮ | ⋮ | ⋮ |
| | B | BB0011 | 13.70 | 0.26 |
| | | BB0012 | 13.50 | 0.46 |
| | | ⋮ | ⋮ | ⋮ |
| | C | CC0011 | 14.24 | -0.28 |
| | | CC0012 | 14.36 | -0.40 |
| | | ⋮ | ⋮ | ⋮ |

| PROCESS P1 ||
|---|---|
| PRIORITY | LOT ID |
| 1 | BB0011 |
| 2 | BB0012 |
| 3 | AA0001 |
| 4 | BB0013 |
| 5 | CC0001 |
| 6 | CC0002 |
| ⋮ | ⋮ |

| PRODUCT TYPE A | |
|---|---|
| DATE | QUANTITY |
| 2008/02/03 | 30 |
| 2008/02/10 | 25 |
| 2008/02/17 | 40 |
| 2008/02/24 | 10 |
| ⋮ | ⋮ |

| PROCESS P2 | | | |
|---|---|---|---|
| PRODUCT TYPE | LOT ID | QUANTITY | SHIPPING DATE |
| A | AA0111 | 8 | 2008/02/03 |
| | AA0112 | 5 | |
| | ⋮ | ⋮ | ⋮ |
| B | BB0111 | 10 | |
| | BB0112 | 8 | 2008/02/16 |
| | ⋮ | ⋮ | ⋮ |
| C | CC0111 | 20 | |
| | CC0112 | 15 | |
| | ⋮ | ⋮ | ⋮ |

PRIORITY CALCULATION DEVICE, PROGRAM, PRIORITY CALCULATION SYSTEM, AND PRIORITY CALCULATION METHOD

TECHNICAL FIELD

The present invention relates to a technology for calculating a priority of a lot to be introduced into a manufacturing stage.

BACKGROUND ART

As a technology for determining a sequence of introducing in-process items in a manufacturing stage into a manufacturing device, there is a technology for calculating a priority by a critical ratio (CR) method (see, for example, Patent Literature 1).

In the CR method, a value (CR value) is obtained by dividing a time remaining to complete the in-process items by a time remaining to complete a shipping of the in-process items so as to prioritize the in-process items of a product for which the time remaining to complete a shipping is the shortest.

CITATION LIST

Patent Literature

Patent Literature 1: U.S. Pat. No. 5,818,716 A

SUMMARY OF INVENTION

Technical Problem

With a CR method, in which a priority of in-process items of a product for which the time remaining to complete a shipping is the shortest is raised, it is impossible to calculate the priority of the in-process items to which the shipping timing has not been assigned (in-process items that are not in demand).

Therefore, an object of the present invention is to provide a technology capable of calculating a priority of in-process items that are not in demand as well.

Solution to Problem

In order to achieve the above-mentioned object, according to the present invention, a priority of a lot to be introduced into each manufacturing stage is decided so as to correspond to a product-type-basis demand ratio.

For example, according to the present invention, there is provided a priority calculation device, which calculates a priority of each of lots to be introduced into a manufacturing stage, including: a storage unit which stores: demand information which determines a product type and a demand ratio of the product type during a predetermined period; and process stand-by state information which determines, for each of manufacturing stages, a lot waiting for a processing in the manufacturing stage, a product for which the lot is used, and a quantity of parts included in the lot; and a control unit, in which the control unit is configured to perform, for each of the manufacturing stages, a processing for determining, from the process stand-by state information, the lot waiting for the processing in the manufacturing stage, the product type for which the lot is used, and the quantity of the parts included in the lot, and assigning the priority to each of the lots so that a lot having a product-type-basis ratio of the parts included in the lot pending in the processing of the manufacturing stage and processings subsequent thereto, the product-type-basis ratio being obtained when the determined lot is introduced into the manufacturing stage, that becomes closer to the product-type-basis demand ratio determined by the demand information is preferentially introduced into the manufacturing stage.

Advantageous Effects of Invention

As described above, according to the present invention, a priority of in-process items that are not in demand can be calculated as well.

BRIEF DESCRIPTION OF DRAWINGS

FIG. 5 A schematic diagram of a process information table.
FIG. 6 A schematic diagram of a carry-in information table.
FIG. 12 A schematic diagram of an under-transfer information table.
FIG. 13 A schematic diagram of an inventory item information table.
FIG. 14 A schematic diagram of an improvement information table.
FIG. 20 A schematic diagram of a received order information table.
FIG. 21 A schematic diagram of a process stand-by state information table.

DESCRIPTION OF EMBODIMENTS

Figure 1:
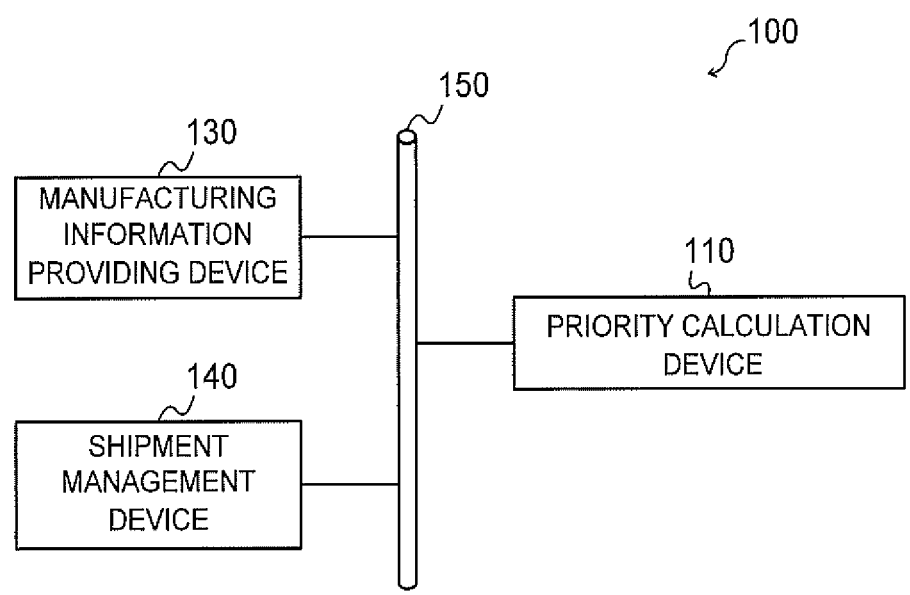
FIG. 1 A schematic diagram of a priority calculation system.

FIG. 1 is a schematic diagram of a priority calculation system 100. As illustrated in the figure, the priority calculation system 100 includes a priority calculation device 110, a manufacturing information providing device 130, and a shipment management device 140, which are configured to be able to transmit/receive information to/from one another via a network 150.

Figure 2:
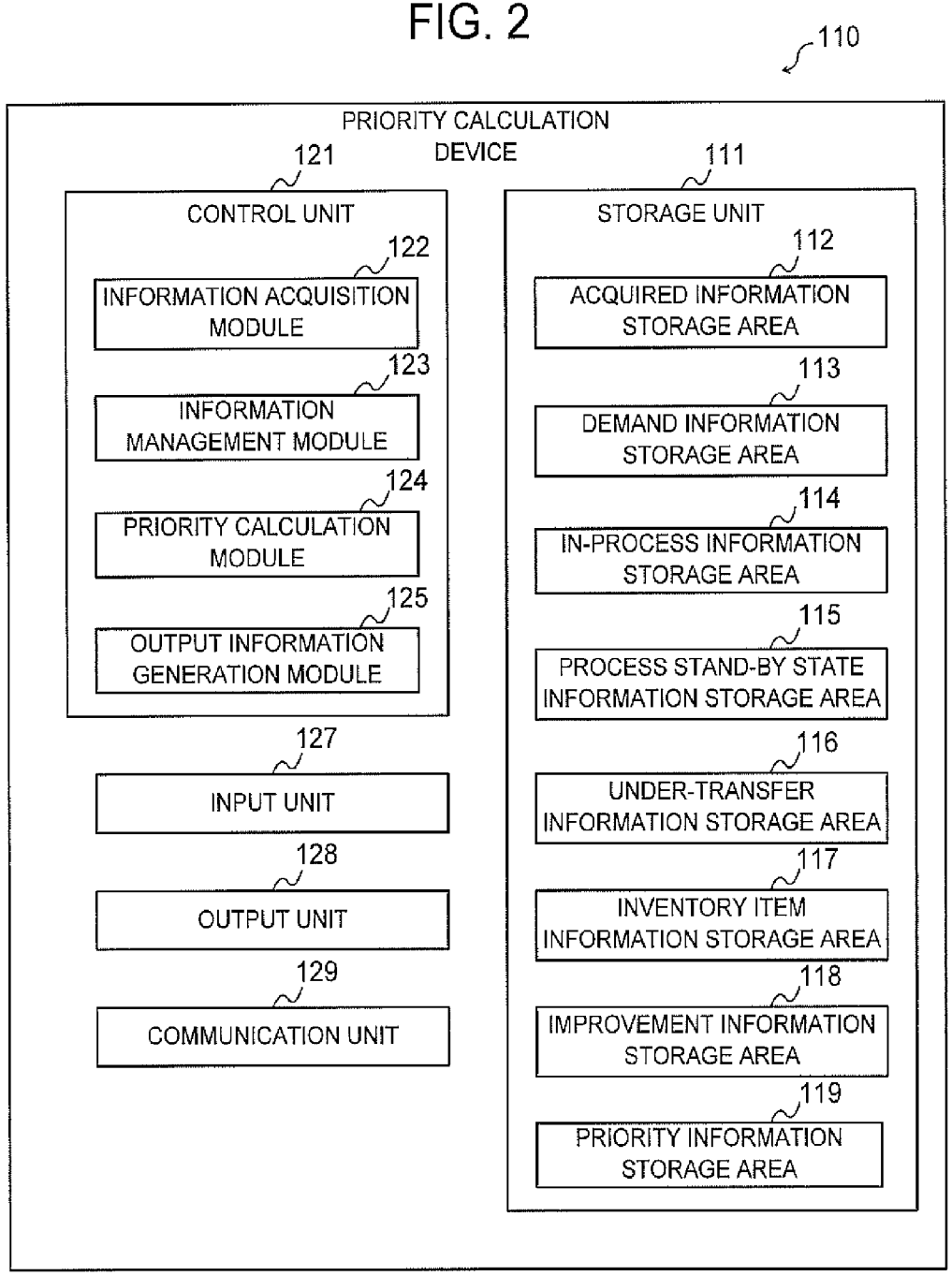
FIG. 2 A schematic diagram of a priority calculation device.

FIG. 2 is a schematic diagram of the priority calculation device 110. As illustrated in the figure, the priority calculation device 110 includes a storage unit 111, a control unit 121, an input unit 127, an output unit 128, and a communication unit 129.

Figure 3:
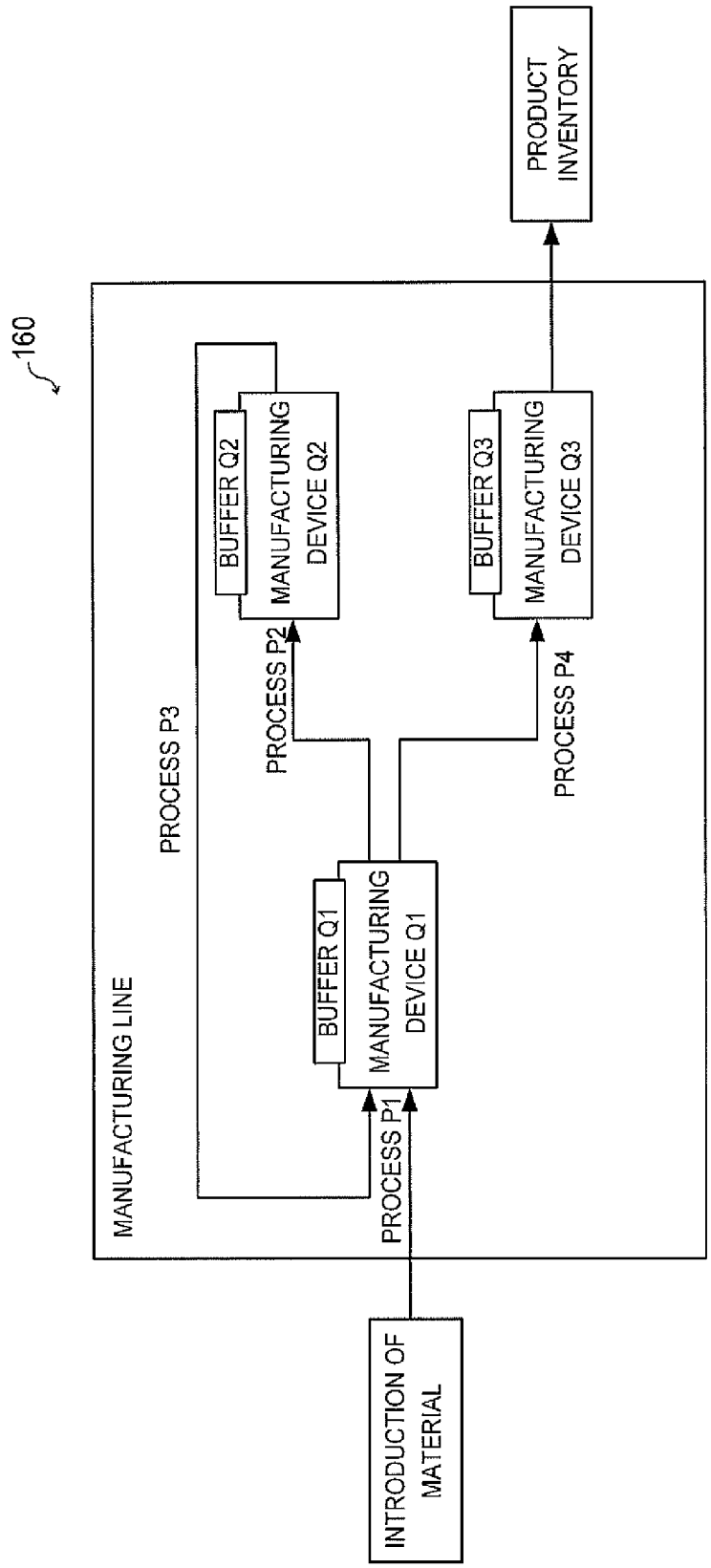
FIG. 3 A schematic diagram of a manufacturing line.

Here, in this embodiment, as illustrated in FIG. 3 (schematic diagram of a manufacturing line 160), a priority of in-process items in the manufacturing line 160 is calculated, the manufacturing line 160 including a manufacturing device Q1, a manufacturing device Q2, and a manufacturing device Q3 and being configured to manufacture products having product types A, B, and C by a process 1 for performing a processing by using the manufacturing device Q1, a process 2 for performing a processing by using the manufacturing device Q2, a process 3 for performing a processing by using the manufacturing device Q1, and a process 4 for performing a processing by using the manufacturing device Q3. However, the present invention is not limited to such a mode.

Further, parts (in-process items) to be introduced into the manufacturing device Q1 are stocked in a buffer Q1, parts (in-process items) to be introduced into the manufacturing device Q2 are stocked in a buffer Q2, and parts (in-process items) to be introduced into the manufacturing device Q3 are stocked in a buffer Q3.

Referring again to FIG. 2, the storage unit 111 includes an acquired information storage area 112, a demand information storage area 113, an in-process information storage area 114, a process stand-by state information storage area 115, an under-transfer information storage area 116, an inventory item information storage area 117, an improvement information storage area 118, and a priority information storage area 119.

Figure 7:
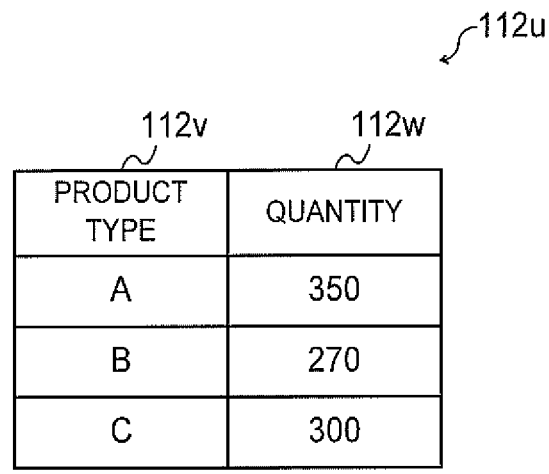
FIG. 7 A schematic diagram of an inventory information table.
Figure 8:
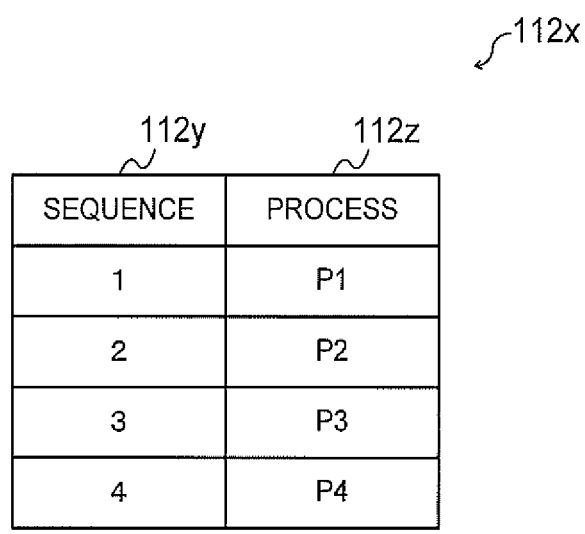
FIG. 8 A schematic diagram of a route information table.

Stored in the acquired information storage area 112 is information acquired from the manufacturing information providing device 130 or the shipment management device 140. For example, in this embodiment, a shipment information table 112a as illustrated in FIG. 4 (schematic diagram of the shipment information table 112a), a process information table 112h as illustrated in FIG. 5 (schematic diagram of the process information table 112h), a carry-in information table 112n as illustrated in FIG. 6 (schematic diagram of the carry-in information table 112n), an inventory information table 112u as illustrated in FIG. 7 (schematic diagram of the inventory information table 112u), and a route information table 112x as illustrated in FIG. 8 (schematic diagram of the route information table 112x) are stored.

Figure 4:
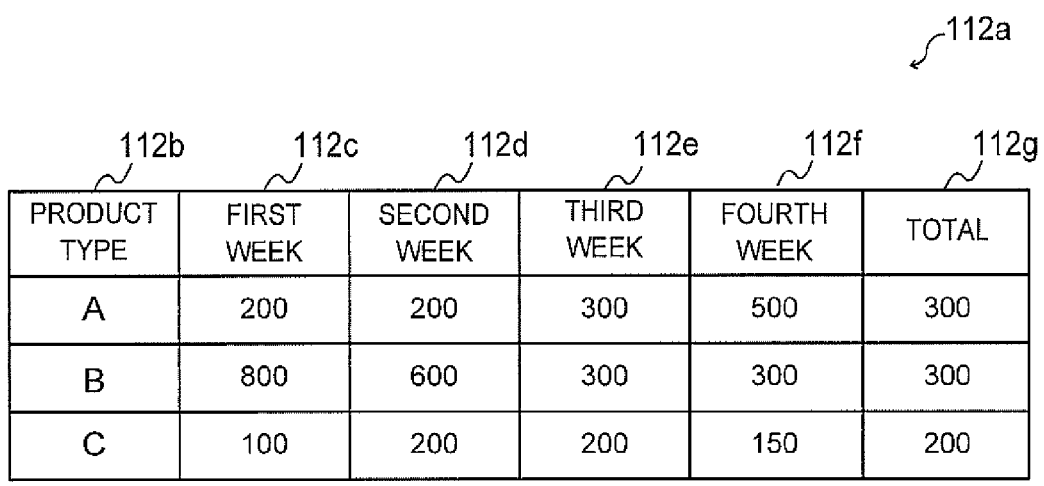
FIG. 4 A schematic diagram of a shipment information table.

The shipment information table 112a illustrated in FIG. 4 has a product type field 112b, a first week field 112c, a second week field 112d, a third week field 112e, a fourth week field 112f, and a total field 112g, and stores shipment information that determines a product-basis shipping volume during a specific period.

Stored in the product type field 112b is information that determines a type of product. Here, in this embodiment, a product type ID that is identification information for uniquely identifying the type of product is stored as the information that determines the type of product.

Stored in the first week field 112c is information that determines the shipping volume of the product having a type determined by the product type field 112b for the first week of the specific period.

Stored in the second week field 112d is information that determines the shipping volume of the product having the type determined by the product type field 112b for the second week of the specific period.

Stored in the third week field 112e is information that determines the shipping volume of the product having the type determined by the product type field 112b for the third week of the specific period.

Stored in the fourth week field 112f is information that determines the shipping volume of the product having the type determined by the product type field 112b for the fourth week of the specific period.

Stored in the total field 112g is information that determines the total shipping volume of the product having the type determined by the product type field 112b within a period between the first week and the fourth week.

Note that, in this embodiment, the shipping volume of the product is summed up monthly, but the present invention is not limited to such a mode, and an arbitrary period can be selected as a period for summing up the shipping volume of the product.

Further, the information stored in the shipment information table 112a is acquired from the shipment management device 140.

The process information table 112h illustrated in FIG. 5 has a lot ID field 112i, a product type field 112j, a process field 112k, and a quantity field 112l, and stores process information that determines a lot to be processed in each process (lot which has already been introduced into a manufacturing device located in a production line).

Stored in the lot ID field 112i is information that determines a lot to be processed in the process. Here, in this embodiment, a lot ID that is identification information for uniquely identifying the lot is stored as the information that determines the lot.

Stored in the product type field 112j is information that determines the type of product for which the lot determined by the lot ID field 112i is used. Here, in this embodiment, the product type ID that is the identification information for uniquely identifying the type of product is stored as the information that determines the type of product.

Stored in the process field 112k is information that determines a process in which the lot determined by the lot ID field 112i is to be processed. Here, in this embodiment, a process ID that is identification information for uniquely identifying the process is stored as the information that determines the process.

Stored in the quantity field 112l is information that determines the number of parts included in the lot determined by the lot ID field 112i.

Note that, information stored in the process information table 112h is acquired from the manufacturing information providing device 130.

The carry-in information table 112n illustrated in FIG. 6 has a lot ID field 112o, a carry-in type field 112p, a previous process field 112q, a subsequent process field 112r, a product type field 112s, and a quantity field 112t, and stores carry-in information that determines a state of the in-process items that are not to be processed in the process.

Stored in the lot ID field 112o is information that determines a lot that is not to be processed in the process (a lot that is stocked in a buffer or a lot that is being transported between processes). Here, in this embodiment, a lot ID that is identification information for uniquely identifying the lot is stored as the information that determines the lot.

Stored in the carry-in type field 112p is information that determines a state of the lot determined by the lot ID field 112o. Here, in this embodiment, the carry-in type field 112p indicates, if the character string "moved between processes" is stored therein, that the lot determined by the lot ID field 112o is being transported between processes determined by the previous process field 112q and the subsequent process field 112r that are described later, and indicates, if the character string "stocked" is stored therein, indicates that the lot determined by the lot ID field 112o is stocked in the buffer of the process determined by the subsequent process field 112r.

Stored in the previous process field 112q is information that determines the previous process in which the lot determined by the lot ID field 112o has been processed. Here, in this embodiment, the process ID that is the identification information for uniquely identifying the process is stored as the information that determines the process.

Stored in the subsequent process field 112r is information that determines the process in which the lot determined by the lot ID field 112o is to be performed subsequently. Here, in this embodiment, the process ID that is the identification information for uniquely identifying the process is stored as the information that determines the process.

Stored in the product type field 112s is information that determines the type of product for which the lot determined by the lot ID field 112o is used. Here, in this embodiment, the product type ID that is the identification information for uniquely identifying the type of product is stored as the information that determines the type of product.

Stored in the quantity field 112t is information that determines the number of parts included in the lot determined by the lot ID field 112o.

Note that, the information stored in the carry-in information table 112n is acquired from the manufacturing information providing device 130.

The inventory information table 112u illustrated in FIG. 7 has a product type field 112v and a quantity field 112w, and stores inventory information that determines an inventory quantity of the completed product.

Stored in the product type field 112v is information that determines the type of product. Here, in this embodiment, the product type ID that is the identification information for uniquely identifying the type of product is stored as the information that determines the type of product.

Stored in the quantity field 112w is information that determines the inventory quantity of the product determined by the product type field 112v.

The route information table 112x illustrated in FIG. 8 has a sequence field 112y and a process field 112z, and stores route information that determines a sequence of processes for manufacturing the product.

Stored in the sequence field 112y is information that determines a sequence of processes. Here, in this embodiment, natural numbers starting from "1" are stored as the information that determines sequences of processes.

Stored in the process field 112z is information that determines the process corresponding to the sequence determined by the sequence field 112y. Here, in this embodiment, the process ID that is the identification information for uniquely identifying the process is stored as the information that determines the process.

Figure 9:
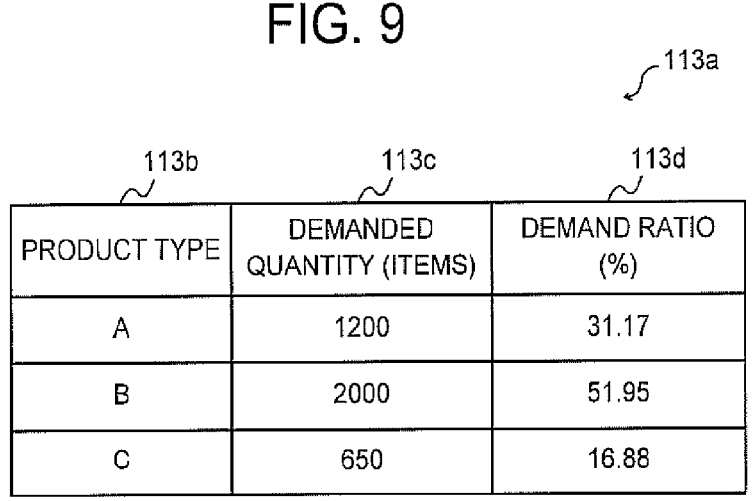
FIG. 9 A schematic diagram of a demand information table.

Referring again to FIG. 2, stored in the demand information storage area 113 is demand information that determines a product-basis demand ratio. For example, in this embodiment, a demand information table 113a as illustrated in FIG. 9 (schematic diagram of the demand information table 113a) is stored.

The demand information table 113a has a product type field 113b, a demanded quantity field 113c, and a demand ratio field 113d.

Stored in the product type field 113b is information that determines the type of product. Here, in this embodiment, the product type ID that is the identification information for uniquely identifying the type of product is stored as the information that determines the type of product.

Stored in the demanded quantity field 113c is information that determines a demanded quantity of a product having a type determined by the product type field 113b during the specific period.

Stored in the demand ratio field 113d is information that determines a ratio of the demanded quantity of the product having the type determined by the product type field 113b during the specific period.

Note that, the demand information table 113a stores a value acquired from the shipment information table 112a and a value calculated from the above-mentioned value.

Figure 10:
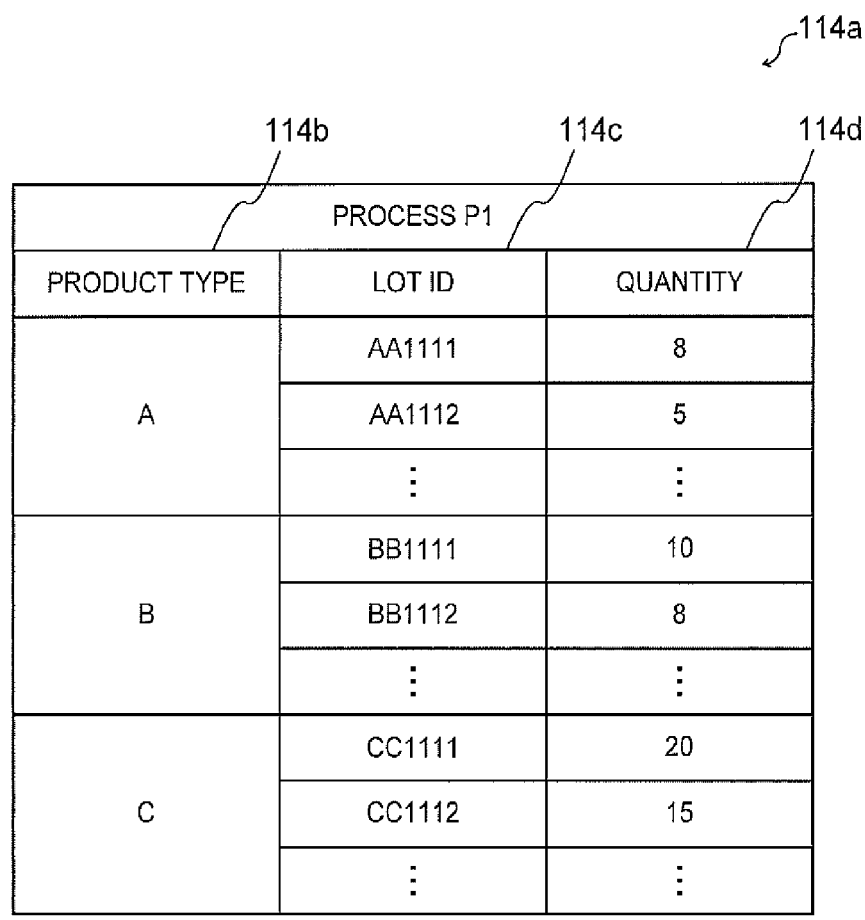
FIG. 10 A schematic diagram of an in-process information table.

Referring again to FIG. 2, stored in the in-process information storage area 114 for each process is in-process information that determines a lot introduced into the process (to be processed in the process) and number of parts included in the lot. For example, in this embodiment, an in-process information table 114a as illustrated in FIG. 10 (schematic diagram of the in-process information table 114a) is stored for each process.

The in-process information table 114a has a product type field 114b, a lot ID field 114c, and a quantity field 114d.

Stored in the product type field 114b is information that determines the type of product. Here, in this embodiment, the product type ID that is the identification information for uniquely identifying the type of product is stored as the information that determines the type of product.

Stored in the lot ID field 114c is information that determines a lot which is used for a product having a type determined by the product type field 114b and which has been introduced into the process targeted by the in-process information table 114a (which is to be processed in the process). Here, in this embodiment, the lot ID that is the identification information for uniquely identifying the lot is stored as the information that determines the lot.

Stored in the quantity field 114d is information that determines the number of parts included in the lot determined by the lot ID field 114c.

Here, the in-process information table 114a stores information summed up from the process information table 112h.

Figure 11:
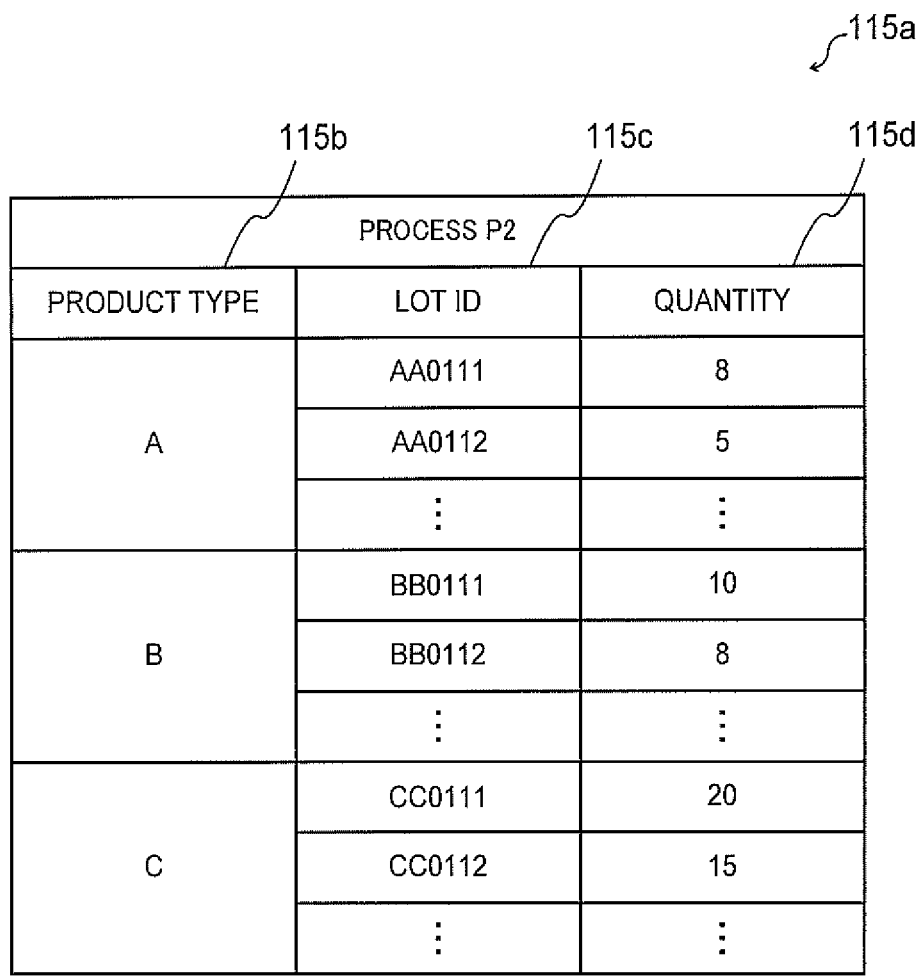
FIG. 11 A schematic diagram of a process stand-by state information table.

Referring again to FIG. 2, stored in the process stand-by state information storage area 115 for each process is in-process information that determines a lot stocked in the buffer of the process and number of parts included in the lot. For example, in this embodiment, a process stand-by state information table 115a as illustrated in FIG. 11 (schematic diagram of the process stand-by state information table 115a) is stored for each process.

The process stand-by state information table 115a has a product type field 115b, a lot ID field 115c, and a quantity field 115d.

Stored in the product type field 115b is information that determines the type of product. Here, in this embodiment, the product type ID that is the identification information for uniquely identifying the type of product is stored as the information that determines the type of product.

Stored in the lot ID field 115c is information that determines a lot which is used for a product having a type determined by the product type field 115b and which has been stocked in the buffer of the process targeted by the process stand-by state information table 115a (which is waiting to be introduced into the process). Here, in this embodiment, the lot ID that is the identification information for uniquely identifying the lot is stored as the information that determines the lot.

Stored in the quantity field 115*d* is information that determines the number of parts included in the lot determined by the lot ID field 115*c*.

Here, the process stand-by state information table 115*a* stores information summed up from the carry-in information table 112*n*.

Referring again to FIG. 2, stored in the under-transfer information storage area 116 for each process is under-transfer information that determines a lot being transferred to a current process after the lot has been through a previous process which should be completed prior to starting the current process and the number of parts included in the lot. For example, in this embodiment, an under-transfer information table 116*a* as illustrated in FIG. 12 (schematic diagram of the under-transfer information table 116*a*) is stored for each process.

The under-transfer information table 116*a* has a product type field 116*b*, a lot ID field 116*c*, and a quantity field 116*d*.

Stored in the product type field 116*b* is information that determines the type of product. Here, in this embodiment, the product type ID that is the identification information for uniquely identifying the type of product is stored as the information that determines the type of product.

Stored in the lot ID field 116*c* is information that determines a lot which is used for a product having a type determined by the product type field 116*b* and which is being transferred after the lot has been through a process preceding the process targeted by the under-transfer information table 116*a*. Here, in this embodiment, the lot ID that is the identification information for uniquely identifying the lot is stored as the information that determines the lot.

Stored in the quantity field 116*d* is information that determines the number of parts included in the lot determined by the lot ID field 116*c*.

Here, the under-transfer information table 116*a* stores information summed up from the carry-in information table 112*n*.

Referring again to FIG. 2, stored in the inventory item information storage area 117 is inventory item information that determines the inventory quantity of the completed product. For example, in this embodiment, an inventory item information table 117*a* as illustrated in FIG. 13 (schematic diagram of the inventory item information table 117*a*) is stored.

The inventory item information table 117*a* has a product type field 117*b* and a quantity field 117*c*.

Stored in the product type field 117*b* is information that determines the type of product. Here, in this embodiment, the product type ID that is the identification information for uniquely identifying the type of product is stored as the information that determines the type of product.

Stored in the quantity field 117*c* is information that determines the inventory quantity of a product having a type determined by the product type field 117*b*.

Here, the inventory item information table 117*a* stores the same information as the information stored in the inventory information table 112*u*.

Referring again to FIG. 2, stored in the improvement information storage area 118 for each process is improvement information that determines an improvement amount between: a Euclidean distance between the demand ratio of a product and a ratio of the product among the in-process items in the process and the subsequent processes; and the Euclidean distance obtained when the lot waiting in the buffer of the process is introduced into the process. For example, in this embodiment, an improvement information table 118*a* as illustrated in FIG. 14 (schematic diagram of the improvement information table 118*a*) is stored for each process.

The improvement information table 118*a* has a pre-introduction Euclidean distance field 118*b*, a product type field 118*c*, a lot ID field 118*d*, a post-introduction Euclidean distance field 118*e*, and an improvement amount field 118*f*.

Stored in the pre-introduction Euclidean distance field 118*b* is information that determines the value of the Euclidean distance between the demand ratio of a product and the ratio of the product among the in-process items in the process targeted by the improvement information table 118*a* and the subsequent processes.

The product type field 118*c* is information that determines the type of product. Here, in this embodiment, the product type ID that is the identification information for uniquely identifying the type of product is stored as the information that determines the type of product.

Stored in the lot ID field 118*d* is information that determines a lot which is used for the product type field 118*c* and which is stocked in the buffer of the process targeted by the improvement information table 118*a*. Here, in this embodiment, the lot ID that is the identification information for uniquely identifying the lot is stored as the information that determines the lot.

Stored in the post-introduction Euclidean distance field 118*e* is information that determines the value of the Euclidean distance between the demand ratio of a product and the ratio of the product among the in-process items in the process targeted by the improvement information table 118*a* and the subsequent processes, the Euclidean distance being obtained when the lot determined by the lot ID field 118*d* is introduced into the process targeted by the improvement information table 118*a*.

Stored in the improvement amount field 118*f* is information that determines an amount by which the value of the Euclidean distance determined by the pre-introduction Euclidean distance field 118*b* is improved into the value of the Euclidean distance determined by the post-introduction Euclidean distance field 118*e*.

Here, it can be judged that, as the Euclidean distance is closer to zero, the demand ratio of a product and the ratio of the product among the in-process items in the process targeted by the improvement information table 118*a* and the subsequent processes are closer to each other. Therefore, in this embodiment, a value obtained by subtracting "the value of the Euclidean distance determined by the post-introduction Euclidean distance field 118*e*" from "the value of the Euclidean distance determined by the pre-introduction Euclidean distance field 118*b*" is stored in the improvement amount field 118*f* as the improvement amount, and it is judged that as the value of the improvement amount becomes larger, greater improvement is achieved.

Figures 15, 16:
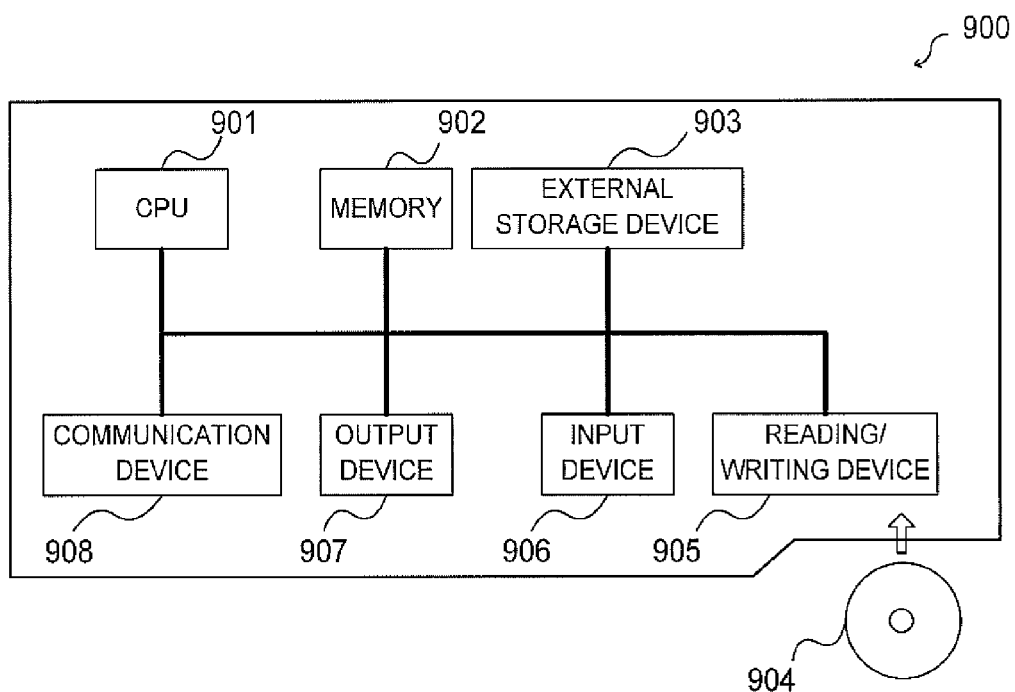
FIG. 15 A schematic diagram of a priority information table.
FIG. 16 A schematic diagram of a computer.

Referring again to FIG. 2, stored in the priority information storage area 119 for each process is priority information that determines the priority with which the lot stocked in the buffer of the process is introduced into the process. For example, in this embodiment, a priority information table 119*a* as illustrated in FIG. 15 (schematic diagram of the priority information table 119*a*) is stored for each process.

The priority information table 119*a* has a priority field 119*b* and a lot ID field 119*c*.

Stored in the priority field 119*b* is information that determines the priority of the lot determined by the lot ID field 119*c* described later. Here, in this embodiment, the priorities are represented by the natural numbers starting from "1", and the priority is set higher with the smaller value.

Stored in the lot ID field 119c is information that determines a lot which is stocked in the buffer of the process targeted by the priority information table 119a and which has the priority determined by the priority field 119b. Here, in this embodiment, the lot ID that is the identification information for uniquely identifying the lot is stored as the information that determines the lot.

Referring again to FIG. 2, the control unit 121 includes an information acquisition module 122, an information management module 123, a priority calculation module 124, and an output information generation module 125.

The information acquisition module 122 acquires the information to be stored in the process information table 112h, the carry-in information table 112n, and the inventory information table 112u from the manufacturing information providing device 130 at a predetermined timing (for example, every 60 seconds), and performs a processing for updating those tables.

Further, the information acquisition module 122 acquires the information to be stored in the route information table 112x from the manufacturing information providing device 130, and performs a processing for storing the information in the acquired information storage area 112. Note that, when a process for manufacturing the product is changed, the information acquisition module 122 acquires the information that determines at least a changed process from the manufacturing information providing device 130, and performs a processing for updating the route information table 112x.

In addition, the information acquisition module 122 acquires the information to be stored in the shipment information table 112a from the shipment management device 140 every specific period (for example, every week), and performs a processing for updating the shipment information table 112a.

For example, when acquiring the information transmitted from the shipment management device 140 every week, the information acquisition module 122 updates the shipment information table 112a by discarding the information stored in the first week field 112c, storing the information that has been stored in the second week field 112d into the first week field 112c, storing the information that has been stored in the third week field 112e into the second week field 112d, storing the information that has been stored in the fourth week field 112f into the third week field 112e, storing the information acquired from the shipment management device 140 into the fourth week field 112f, and adding the values of the respective records to update the value of the total field 112g.

The information management module 123 updates the demand information table 113a when the information acquisition module 122 updates the shipment information table 112a.

For example, the information management module 123 performs a processing for acquiring the information stored in the total field 112g of the shipment information table 112a, storing the information in the corresponding record of the demanded quantity field 113c of the demand information table 113a, calculating the demand ratio based on the updated demanded quantity (demanded quantity of each product type/demanded quantity of all the product types), and storing the demand ratio in the demand ratio field 113d.

Further, when the information acquisition module 122 updates the process information table 112h, the carry-in information table 112n, or the inventory information table 112u, the information management module 123 updates the in-process information table 114a, the process stand-by state information table 115a, the under-transfer information table 116a, and the inventory item information table 117a.

For example, when the process information table 112h is updated, the information management module 123 references the process field 112k of the process information table 112h, determines a record of each specific process, extracts the lot ID and the quantity from the lot ID field 112i and the quantity field 112l, respectively, for each product type of the determined record, and stores the acquired lot ID and the acquired quantity in the lot ID field 114c and the quantity field 114d, respectively, so as to replace the existing values for each of the product types stored in the product type field 114b of the in-process table 114a corresponding to the specific process.

Further, when the carry-in information table 112n is updated, the information management module 123 determines a record of the carry-in information table 112n which has "stocked" stored in the carry-in type field 112p, and extracts the lot ID, the process ID, the product type, and the quantity of the determined record from the lot ID field 112o, the subsequent process field 112r, the product type field 112s, and the quantity field 112t, respectively. Then, the information management module 123 clears the lot ID field 115c and the quantity field 115d corresponding to the extracted product type within the process stand-by state information table 115a corresponding to the extracted process ID, and stores the extracted lot ID and the extracted quantity in those fields.

In addition, when the carry-in information table 112n is updated, the information management module 123 determines a record of the carry-in information table 112n which has "moved between processes" stored in the carry-in type field 112p, and extracts the lot ID, the process ID, the product type, and the quantity of the determined record from the lot ID field 112o, the previous process field 112q, the product type field 112s, and the quantity field 112t, respectively. Then, the information management module 123 clears the lot ID field 116c and the quantity field 116d corresponding to the extracted product type within the under-transfer information table 116a corresponding to the extracted process ID, and stores the extracted lot ID and the extracted quantity in those fields.

Further, when the inventory information table 112u is updated, the information management module 123 performs a processing for storing the information stored in the inventory item information storage area 117 so as to replace the information within the inventory item information table 117a by the information within the updated inventory information table 112u.

The priority calculation module 124 calculates, for each process, a Euclidean distance $dd_i$ between a product-basis ratio of the in-process items pending in the processing of the process and processings subsequent thereto and the product-basis demand ratio stored in the demand information table 113a by using the following Expression (1).

[Ex. 1]

$$dd_i \sqrt{\sum_{j=1}^{n} |x_{ij} - y_j|^2} \quad (1)$$

Here, "i" represents an index assigned to each process, and the natural numbers starting from "1" are assigned as the indices to the respective processes according to the sequence of processes.

Further, "j" represents an index assigned to the product type, and the natural numbers starting from "1" are assigned as the indices to the respective product types. "n" represents a natural number indicating the number of product types (the number of types).

In addition, "$x_{ij}$" represents the ratio of the in-process items for a product type j, which are pending in the processing of a process i and the subsequent processings, and the inventory therefor.

For example, the priority calculation module 124 extracts the quantities of the product type j from the quantity fields 114d of the in-process information tables 114a corresponding to the process i and the subsequent processes (the process i, . . . ) in the sequence of processes, further extracts the quantities of the product type j from the quantity fields 115d of the process stand-by state information tables 115a corresponding to the processes after the process i (process subsequent to the process i, . . . ), further extracts the quantities of the product type j from the quantity fields 116d of the under-transfer information tables 116a corresponding to the process i and the subsequent processes (the process i, . . . ), further extracts the inventory quantity of the product type j from the quantity field 117c of the inventory item information table 117a, and calculates an added value from the extracted quantities.

Further, the priority calculation module 124 extracts the quantities of all the product types from the quantity fields 114d of the in-process information tables 114a corresponding to the process i and the subsequent processes (the process i, . . . ) in the sequence of processes, further extracts the quantities of all the product types from the quantity fields 115d of the process stand-by state information tables 115a corresponding to the processes after the process i (process subsequent to the process i, . . . ), further extracts the quantities of all the product types from the quantity fields 116d of the under-transfer information tables 116a corresponding to the process i and the subsequent processes (the process i, . . . ), further extracts the inventory quantities of all the product types from the quantity field 117c of the inventory item information table 117a, and calculates an added value from the extracted quantities.

Then, the priority calculation module 124 calculates $x_{ij}$ by dividing the added value for the product type j calculated as described above by the added value for all the product types and multiplying the obtained value by "100".

"$y_j$" represents the demand ratio of the product type j having a value extracted from the demand ratio field 113d of the demand information table 113a.

Then, the priority calculation module 124 stores the Euclidean distance $dd_i$ calculated as described above in the pre-introduction Euclidean distance field 118b of the improvement information table 118a for the process corresponding to i.

Subsequently, for each process, the priority calculation module 124 determines lots waiting in the process, the product type for which the lot is used, and the quantity of the parts included in the lot from the process stand-by state information table 115a, and when one arbitrary lot among the determined lots is introduced into the process, calculates a Euclidean distance $sd_{ik}$ between the product-basis ratio of the in-process items pending in the processing of the process and the subsequent processings and the product-basis demand ratio stored in the demand information table 113a by using the following Expression (2).

[Ex. 2]

$$sd_{ik} = \sqrt{\sum_{j=1}^{n} |x_{ijk} - y_j|^2} \quad (2)$$

Here, "k" represents an index assigned to each lot that is waiting for the process i, and the natural numbers starting from "1" are assigned as the indices to the respective lots.

Further, "$x_{ijk}$" represents the ratio of the in-process items for the product type j, which are pending in the processing of the process i and the subsequent processings, and the inventory therefor which are obtained in a case where the quantity of the parts included in the lot determined by k is added to the quantity of the above-mentioned in-process items and inventory. Note that, the quantity of the in-process items for the product type j, which are pending in the processing of the process i and the subsequent processings, and the inventory therefor may be calculated in the same manner as in the case of the Euclidean distance $dd_i$.

Then, in a record of the improvement information table 118a for the process corresponding to i in which the product type for which the lot corresponding to k is used is stored in the product type field 118c, the priority calculation module 124 stores the lot ID of the lot corresponding to k in the lot ID field 118d, and stores the Euclidean distance $sd_{ik}$ calculated as described above in the post-introduction Euclidean distance field 118e within the record storing the lot ID.

Subsequently, the priority calculation module 124 stores a value obtained by subtracting the Euclidean distance $sd_{ik}$ stored in the post-introduction Euclidean distance field 118e from the Euclidean distance $dd_i$ stored in the pre-introduction Euclidean distance field 118b into the improvement amount field 118f within the record in which the lot ID of the lot corresponding to k is stored in the lot ID field 118d.

Subsequently, for each process, the priority calculation module 124 generates the priority information table 119a so that the higher priority is given to the lot having the larger value stored in the improvement amount field 118f, and stores the priority information table 119a in the priority information storage area 119.

Note that, the lots having the same value stored in the improvement amount field 118f may be given an arbitrary priority so that the higher priority is given to, for example, the lot having the smaller lot number or the lot for which the lot ID was stored in the process stand-by state information table 115 at the earlier timing.

The output information generation module 125 performs a processing for generating output information obtained by converting the information stored in the in-process information table 114a, the process stand-by state information table 115a, the under-transfer information table 116a, and the priority information table 119a into a predetermined display format and outputting the output information to the output unit 128.

The input unit 127 receives an input of information.

The output unit 128 outputs information.

The communication unit 129 performs transmission/reception of information via the network 150.

The priority calculation device 110 described above can be obtained by, for example, a general computer 900 as illustrated in FIG. 16 (schematic diagram of the computer 900) which includes a central processing unit (CPU) 901, a memory 902, an external storage device 903 such as a hard disk drive (HDD), a reading/writing device 905 for reading/writing information from/to a storage medium 904 having portability such as a compact disk (CD) or a digital versatile disk (DVD), an input device 906 including a keyboard and a mouse, an output device 907 such as a display, and a communication device 908 such as a network interface card (NIC) that allows connection to a communication network.

For example, the storage unit 111 can be obtained when the CPU 901 uses the memory 902 or the external storage device 903, the control unit 121 can be obtained when a predetermined program stored in the external storage device 903 is loaded into the memory 902 and executed by the CPU 901, the input unit 127 can be obtained when the CPU 901 uses the input device 906, the output unit 128 can be obtained when the CPU 901 uses the output device 907, and the communication unit 129 can be obtained when the CPU 901 uses the communication device 908.

The predetermined program may be downloaded onto the external storage device 903 from the storage medium 904 via the reading/writing device 905 or from a network via the communication device 908, then loaded into the memory 902, and executed by the CPU 901. Further, the predetermined program may be downloaded directly into the memory 902 from the storage medium 904 via the reading/writing device 905 or from a network via the communication device 908, and executed by the CPU 901.

The manufacturing information providing device 130 is a device that extracts data to be stored in the process information table 112*h*, the carry-in information table 112*n*, the inventory information table 112*u*, and the route information table 112*x* from MES data obtained from a manufacturing executing system (MES) managing the manufacturing devices Q1 to Q3 and the like in the manufacturing line 160, and transmits the extracted data to the priority calculation device 110 via the network 150.

Note that, the manufacturing information providing device 130 can also be obtained by the general computer 900 as illustrated in FIG. 16.

The shipment management device 140 is a device that performs management of the product manufactured in the manufacturing line 160, and may be any device that can transmit the information to be stored in the shipment information table 112*a* to the priority calculation device 110 via the network 150.

Note that, the shipment management device 140 can also be obtained by the general computer 900 as illustrated in FIG. 16.

Figure 17:
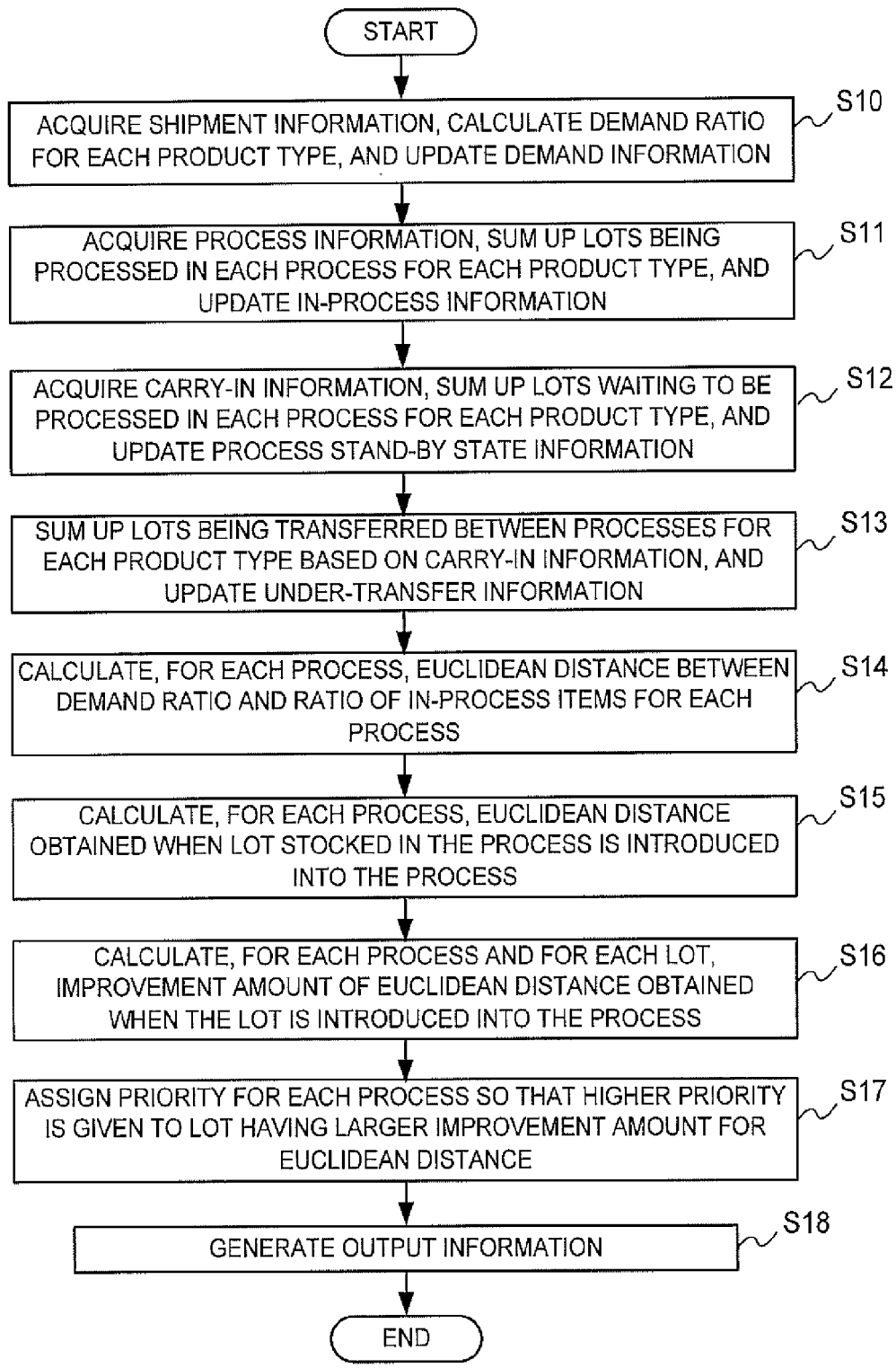
FIG. 17 A flowchart illustrating a processing performed on the priority calculation device.

FIG. 17 is a flowchart illustrating a processing performed on the priority calculation device 110.

First, when the information acquisition module 122 acquires the shipment information from the shipment management device 140 and updates the shipment information table 112*a*, the information management module 123 performs a processing for updating the demand information table 113*a* by updating the demanded quantity corresponding to the updated shipment information and further updating the demand ratio based on the updated demanded quantity (S10).

Subsequently, when the information acquisition module 122 acquires the process information from the manufacturing information providing device 130 and updates the process information table 112*h*, the information management module 123 performs a processing for updating the in-process information table 114*a* by determining the process ID, the product type, the lot ID, and the quantity of the parts included in the lot determined by the lot ID in the updated process information and storing those information items in the corresponding record of the in-process information table 114*a* (S11).

Subsequently, when the information acquisition module 122 acquires the carry-in information from the manufacturing information providing device 130 and updates the carry-in information table 112*n*, the information management module 123 performs a processing for updating the process stand-by state information table 115*a* by determining the lot ID, the process ID of the subsequent process, the product type, and the quantity of the parts included in the lot determined by the lot ID within the record having "stocked" stored as a carry-in type in the updated carry-in information and storing those information items in the corresponding record of the process stand-by state information table 115*a* (S12).

Subsequently, when the information acquisition module 122 acquires the carry-in information from the manufacturing information providing device 130 and updates the carry-in information table 112*n*, the information management module 123 performs a processing for updating the under-transfer information table 116*a* by determining the lot ID, the process ID of the previous process, the product type, and the quantity of the parts included in the lot determined by the lot ID within the record having "moved between processes" stored as the carry-in type in the updated carry-in information and storing those information items in the corresponding record of the under-transfer information table 116*a* (S13).

Subsequently, for each process, the priority calculation module 124 calculates the Euclidean distance $dd_i$ between the product-basis ratio of the in-process items pending in the processing of the process and the subsequent processings and the product-basis demand ratio stored in the demand information table 113*a* by using the above-mentioned Expression (1), the calculation being performed for all the processes (S14).

Note that, the Euclidean distance $dd_i$ thus calculated is stored in the pre-introduction Euclidean distance field 118*b* of the improvement information table 118*a* corresponding to the process i.

Subsequently, for each process, the priority calculation module 124 determines a lot waiting for the processing in the process, the product type for which the lot is used, and the quantity of the parts included in the lot from the process stand-by state information table 115*a*, and when one arbitrary lot among the determined lots is introduced into the process, calculates the Euclidean distance $sd_{ik}$ between the product-basis ratio of the in-process items pending in the processing of the process and the subsequent processings and the product-basis demand ratio stored in the demand information table 113*a* by using the above-mentioned Expression (2), the calculation being performed for all the lots of all the processes (S15).

Subsequently, the priority calculation module 124 subtracts the Euclidean distance $sd_{ik}$ calculated in Step S15 from the Euclidean distance $dd_i$ calculated in Step 14 one by one to thereby calculate the improvement amount of the Euclidean distance obtained when the lot determined by k is introduced into the process determined by i, the calculation being performed for all the processes and for all the lots (S16).

Note that, the improvement amount thus calculated is stored in the improvement amount field 118*f* corresponding to the lot determined by k within the improvement amount table 118*a* corresponding to the process determined by i.

Subsequently, for each process, the priority calculation module 124, the priority calculation module 124 generates the priority information table 119*a* so that the higher priority is given to the lot having the larger value stored in the improvement amount field 118*f*, and stores the priority information table 119*a* in the priority information storage area 119 (S17).

Then, the output information generation module 125 generates the output information obtained by converting the information stored in the in-process information table 114*a*, the process stand-by state information table 115*a*, the under-transfer information table 116*a*, and the priority information table 119*a* into the predetermined display format, and outputs the output information to the output unit 128 (S18).

Figure 18:
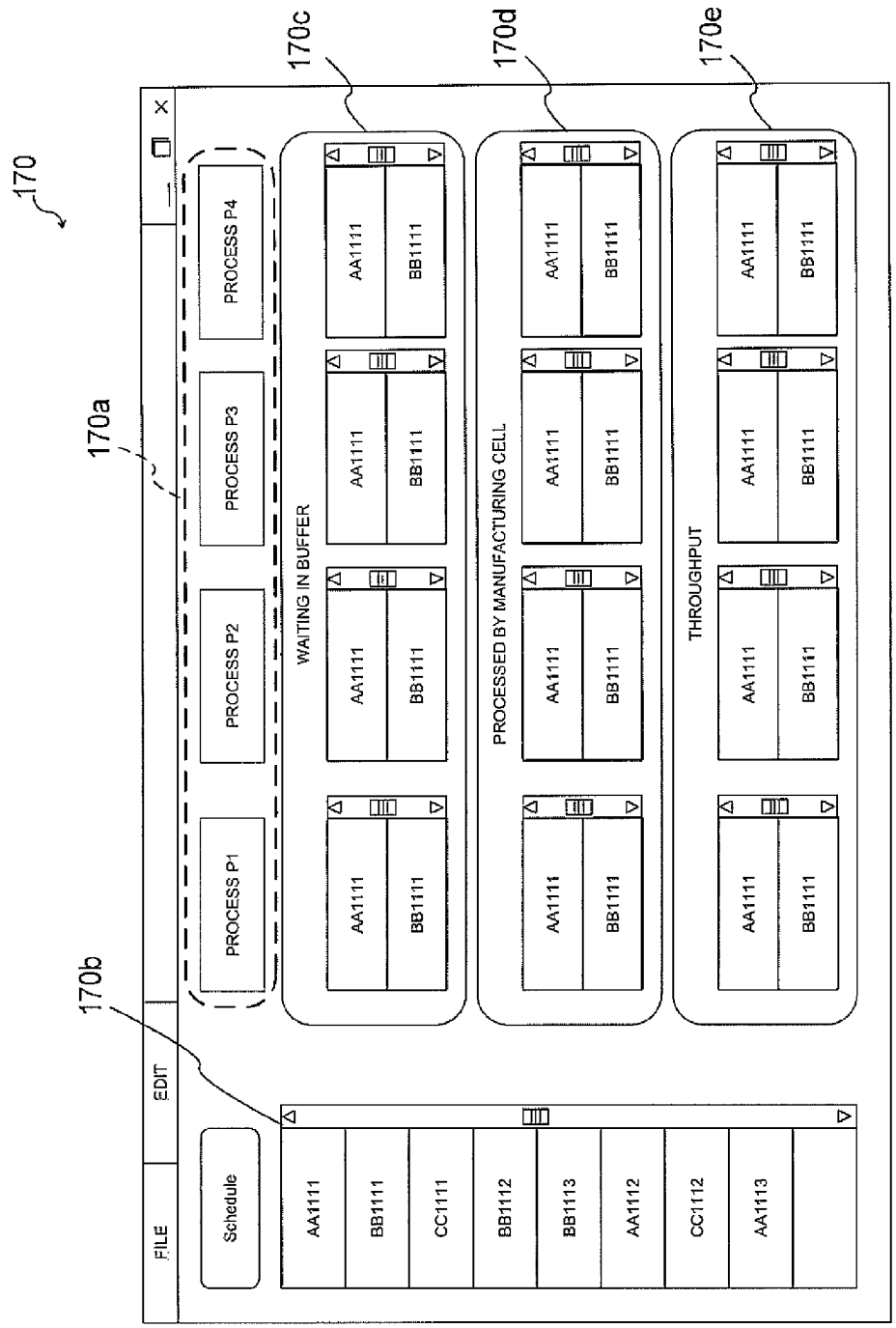
FIG. 18 A schematic diagram of an output screen.

Here, FIG. 18 is a schematic diagram of an output screen 170 that is an example of the output information generated by the output information generation module 125.

The output screen 170 has a process selection area 170*a*, a lot precedence order display area 170*b*, a process stand-by state lot display area 170*c*, an in-process lot display area 170*d*, and a processed lot display area 170*e*.

Then, when an input of an execution instruction that selects a specific range including the process ID displayed in the process selection area 170a is performed on the output screen 170 displayed in the output unit 128 through the input unit 127, the output information generation module 125 displays the lot ID stored in the lot ID field 119c of the priority information table 119a corresponding to the process determined by the selected process ID so that the lot associated with the higher priority determined by the priority field 119b is located in the higher position in the lot precedence order display area 170b, further displays in the process stand-by state lot display area 170c the lot ID stored in the lot ID field 115c of the process stand-by state information table 115a corresponding to the selected process, further displays in the in-process lot display area 170d the lot ID stored in the lot ID field 114c of the in-process information table 114a corresponding to the selected process, and further displays in the processed lot display area 170e the lot ID stored in the lot ID field 116c of the under-transfer information table 116a corresponding to the selected process.

Note that, the information corresponding to the first process in a manufacturing stage for the product is displayed before the input of the execution instruction that selects the specific range including the process ID displayed in the process selection area 170a is performed on the output screen 170 through the input unit 127.

The output screen 170 as described above is displayed on the output unit 128, and hence a manufacturer performing a processing in each process is able to preferentially manufacture the product that meets the demand by introducing the lot associated with the highest priority displayed in the lot precedence order display area 170b into the manufacturing device for the process.

Next, a second embodiment of the present invention is described. In the second embodiment of the present invention, a technology for deciding a sequence of introducing parts into a process is described by combining the priority calculated in the first embodiment with a priority calculated by another method.

Figure 19:
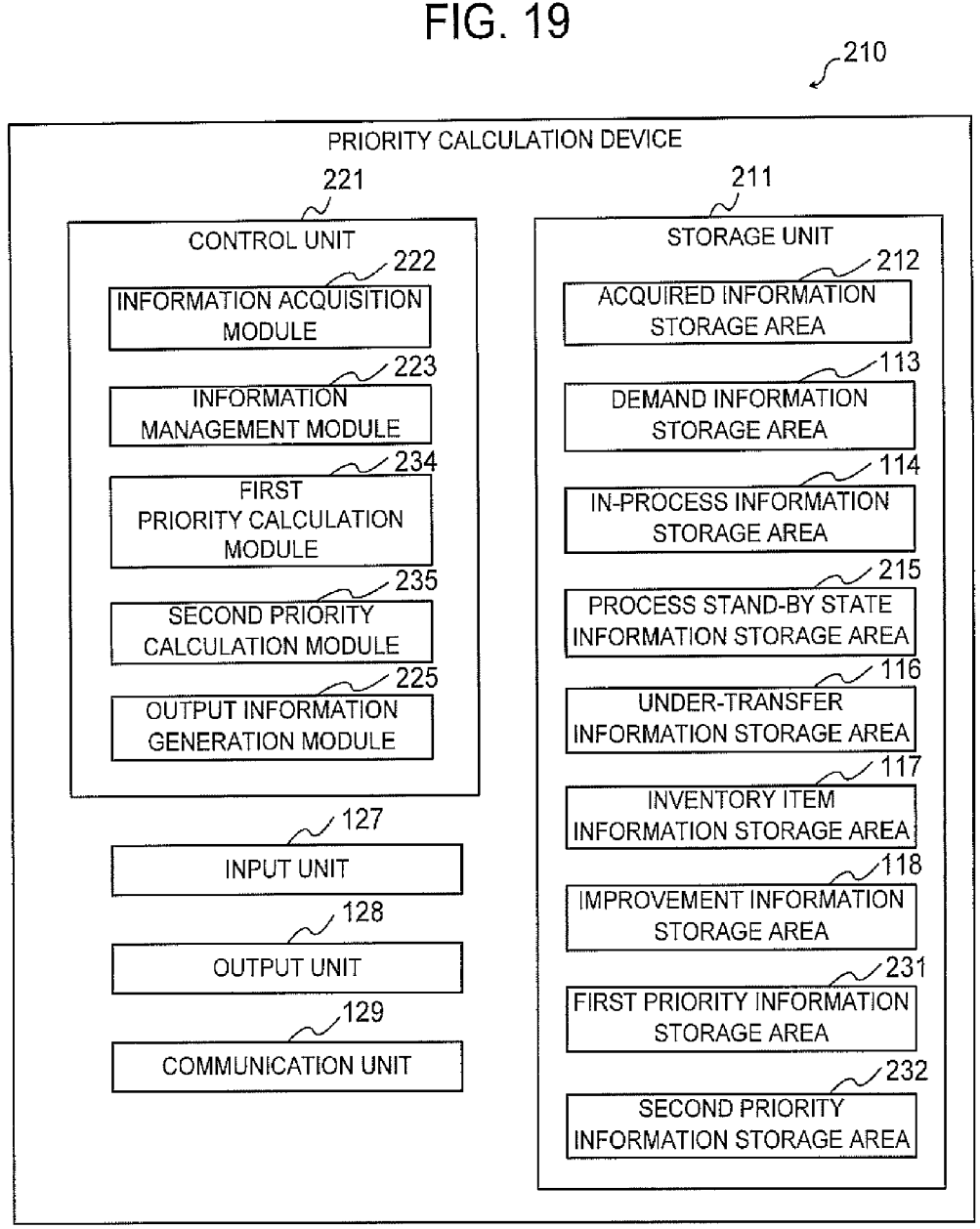
FIG. 19 A schematic diagram of a priority calculation device.

FIG. 19 is a schematic diagram of a priority calculation device 210 according to the second embodiment of the present invention. As illustrated in the figure, the priority calculation device 210 includes a storage unit 211, a control unit 221, the input unit 127, the output unit 128, and the communication unit 129, and is different from the first embodiment in the storage unit 211 and the control unit 221, and hence matters related thereto are described hereinafter.

The storage unit 211 includes an acquired information storage area 212, the demand information storage area 113, the in-process information storage area 114, a process stand-by state information storage area 215, the under-transfer information storage area 116, the inventory item information storage area 117, the improvement information storage area 118, a first priority information storage area 231, and a second priority information storage area 232, and is different from the first embodiment in the information stored in the acquired information storage area 212 and the process stand-by state information storage area 215 and in that the first priority information storage area 231 and the second priority information storage area 232 are provided, and hence matters related thereto are described hereinafter.

Stored in the acquired information storage area 212 is the information acquired from the manufacturing information providing device 130 or the shipment management device 140. Here, in this embodiment, the shipment information table 112a as illustrated in FIG. 4, the process information table 112h as illustrated in FIG. 5, the carry-in information table 112n as illustrated in FIG. 6, the inventory information table 112u as illustrated in FIG. 7, and the route information table 112x as illustrated in FIG. 8 are stored in the same manner as in the first embodiment, and a received order information table 212a as illustrated in FIG. 20 (schematic diagram of the received order information table 212a) is stored for each product type.

The received order information table 212a has a date field 212b and a quantity field 212c, and stores, for each product type, received order information that determines a shipping date, for the product type, when a shipment has been ordered and the quantity thereof.

Stored in the date field 212b is information that determines a year/month/day on which the shipment of a product having a type targeted by the received order information table 212a is scheduled.

Stored in the quantity field 212c is information that determines a shipment scheduled quantity of the product having the type targeted by the received order information table 212a.

Referring again to FIG. 19, stored in the process stand-by state information storage area 215 for each process is the in-process information that determines a lot stocked in the buffer of the process, the number of parts included in the lot, and a date on which the shipment of the product for which the lot is used is scheduled. For example, in this embodiment, a process stand-by state information table 215a as illustrated in FIG. 21 (schematic diagram of the process stand-by state information table 215a) is stored for each process.

The process stand-by state information table 215a has a product type field 215b, a lot ID field 215c, a quantity field 215d, and a shipping date field 215e.

Stored in the product type field 215b is information that determines the type of product. Here, in this embodiment, the product type ID that is the identification information for uniquely identifying the type of product is stored as the information that determines the type of product.

Stored in the lot ID field 215c is information that determines a lot which is used for a product having a type determined by the product type field 215b and has been stocked in the buffer of the process targeted by the process stand-by state information table 215a (which is waiting to be introduced into the process). Here, in this embodiment, the lot ID that is the identification information for uniquely identifying the lot is stored as the information that determines the lot.

Stored in the quantity field 215d is information that determines the number of parts included in the lot determined by the lot ID field 215c.

Stored in the shipping date field 215e is information that determines the year/month/day on which the shipment of the product is scheduled if the shipment of the product for which the parts included in the lot determined by the lot ID field 215c are used has already been decided (if the product has already been decided to be in demand). Note that, in a case where the shipping date field 215e does not contain the information that determines the year/month/day, it means that the shipment is not scheduled (that the product is not yet in demand).

Referring again to FIG. 19, stored in the first priority information storage area 231 is first priority information that determines the priority of each lot in each process calculated by a first priority calculation module 234 of the control unit 221 described later.

Note that, a first priority information table having the same table format as the priority information table 119a illustrated in FIG. 15 (not shown because the table format is the same as the priority information table 119a) is stored in the first priority information storage area 231.

Stored in the second priority information storage area 232 is a second priority information that determines the priority of each lot in each process calculated by a second priority calculation module 235 of the control unit 221 described later.

Note that, a second priority information table having the same table format as the priority information table 119a illustrated in FIG. 15 (not shown because the table format is the same as the priority information table 119a) is stored in the second priority information storage area 232.

The control unit 221 includes an information acquisition module 222, an information management module 223, the first priority calculation module 234, the second priority calculation module 235, and an output information generation module 225.

In the same manner as in the first embodiment, the information acquisition module 222 performs the processing for acquiring the information to be stored in the process information table 112h, the carry-in information table 112n, and the inventory information table 112u from the manufacturing information providing device 130 at the predetermined timing (for example, every 60 seconds) and updating those tables, further performs the processing for acquiring the information to be stored in the route information table 112x from the manufacturing information providing device 130 and storing the information in the acquired information storage area 112, and further performs the processing for acquiring the information to be stored in the shipment information table 112a from the shipment management device 140 for every specific period (for example, every week) and updating the shipment information table 112a.

In addition, the information acquisition module 222 performs a processing for acquiring the information to be stored in the received order information table 212a from the shipment information management device 140 at the predetermined timing (for example, every 60 seconds) and updating the received order information table 212a.

In the same manner as in the first embodiment, the information management module 223 performs the processing for updating the demand information table 113a, the in-process information table 114a, the process stand-by state information table 215a, the under-transfer information table 116a, and the inventory item information table 117a.

Further, the information management module 223 performs a processing for updating the process stand-by state information table 215a when the information acquisition module 222 updates the received order information table 212a.

For example, the information management module 223 determines a record of the process stand-by state information table 215a which corresponds to the lot used for the product having the type targeted by the received order information table 212a, does not contain the information determining the year/month/day in the shipping date field 215e, and determines one or a plurality of records so that the quantity stored in the quantity field 215d within the above-mentioned record is equal to the quantity stored in the quantity field 212c of the received order information table 212a. Then, the information management module 223 determines the lot whose order has been received by storing the date stored in the date field 212b of the received order information table 212a into the shipping date field 215e within the record thus determined.

The first priority calculation module 234 calculates a first priority of introducing the lot having the shipping date defined into each process.

For example, for each process, the first priority calculation module 234 determines a record of the process stand-by state information table 215a in which the shipping date is stored in the shipping date field 215e, obtains for the lot within each of the determined records a value (CR value) by dividing a remaining time until completion of the product (which is stored in advance in the storage unit 211 for each product and for each process) by a remaining time until the shipping date for the product, and decides the priority of each lot so that the higher priority is given to the lot of the product for which a time elapsing before the shipping date is the shortest.

Specifically, the first priority calculation module 234 assigns the priority to the lot in each process so that the higher priority is given to the lot having the calculated CR value closer to "1".

Then, the first priority calculation module 234 stores the priority of each lot thus decided in the first priority information table, and stores the first priority information table in the first priority information storage area 231.

The second priority calculation module 235 calculates a second priority of introducing the lot having the shipping date undefined into each process.

For example, for each process, the second priority calculation module 235 determines a record of the process stand-by state information table 215a in which the shipping date is stored in the shipping date field 215e, and performs the same processing as performed by the priority calculation module 124 in the first embodiment for each lot within the determined record to thereby calculate the second priority.

The output information generation module 225 performs a processing for generating output information obtained by converting the information stored in the in-process information table 114a, the process stand-by state information table 215a, the under-transfer information table 116a, the first priority information table, and the second priority information table into a predetermined display format and outputting the output information to the output unit 128.

The shipment management device 140 according to this embodiment is a device that performs management of the product manufactured in the manufacturing line 160, and may be any device that can transmit the information to be stored in the shipment information table 112a and the received order information table 212a to the priority calculation device 210 via the network 150.

Figure 22:
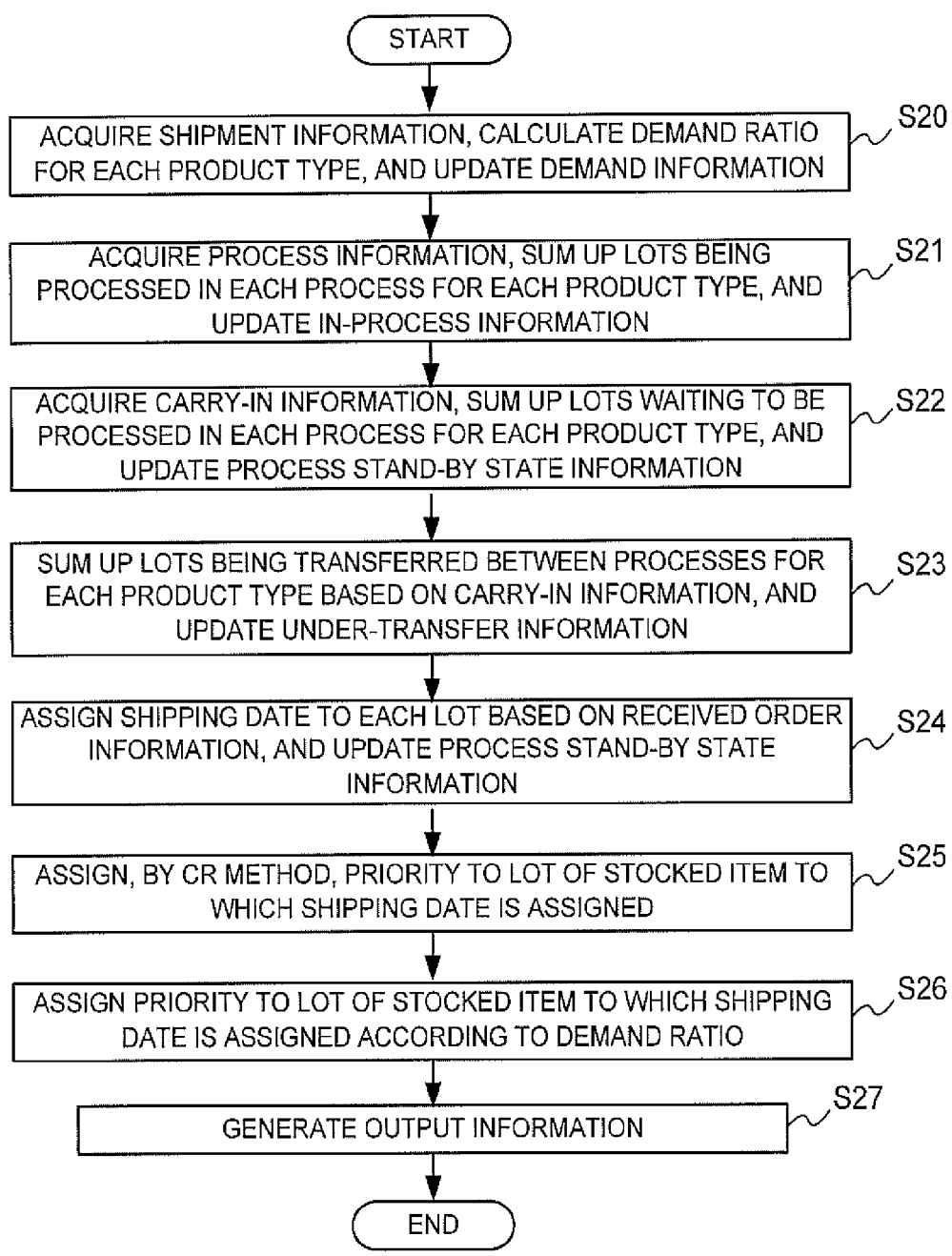
FIG. 22 A flowchart illustrating a processing performed on the priority calculation device.

FIG. 22 is a flowchart illustrating a processing performed on the priority calculation device 210.

First, when the information acquisition module 222 acquires the shipment information from the shipment management device 140 and updates the shipment information table 112a, the information management module 223 performs a processing for updating the demand information table 113a by updating the demanded quantity corresponding to the updated shipment information and further updating the demand ratio based on the updated demanded quantity (S20).

Subsequently, when the information acquisition module 222 acquires the process information from the manufacturing information providing device 130 and updates the process information table 112h, the information management module 223 performs a processing for updating the in-process information table 114a by determining the process ID, the product type, the lot ID, and the quantity of the parts included in the lot determined by the lot ID in the updated process information and storing those information items in the corresponding record of the in-process information table 114a (S21).

Subsequently, when the information acquisition module 222 acquires the carry-in information from the manufacturing information providing device 130 and updates the carry-in information table 112n, the information management module 223 performs a processing for updating the process stand-by state information table 215a by determining the lot ID, the process ID of the subsequent process, the product type, and the quantity of the parts included in the lot determined by the lot ID within the record having "stocked" stored as a carry-in type in the updated carry-in information and storing those information items in the corresponding record of the process stand-by state information table 215a (S22).

Subsequently, when the information acquisition module 222 acquires the carry-in information from the manufacturing information providing device 130 and updates the carry-in information table 112n, the information management module 223 performs a processing for updating the under-transfer information table 116a by determining the lot ID, the process ID of the previous process, the product type, and the quantity of the parts included in the lot determined by the lot ID within the record having "moved between processes" stored as the carry-in type in the updated carry-in information and storing those information items in the corresponding record of the under-transfer information table 116a (S23).

Subsequently, when the information acquisition module 222 acquires the received order information from the shipment information management device 140 and updates the received order information table 212a, the information management module 223 performs a processing for updating the process stand-by state information table 215a by determining the lot of the product whose order has been received for each process and assigning the shipping date to the lot (S24).

Subsequently, for each process, the first priority calculation module 234 determines a record of the process stand-by state information table 215a in which the shipping date is stored in the shipping date field 215e, and decides the first priority of each lot within the determined record by a CR method (S25). Note that, the first priority calculation module 234 stores the priority of each lot thus decided in the first priority information table, and stores the first priority information table in the first priority information storage area 231.

Subsequently, the second priority calculation module 235 calculates the second priority of introducing the lot having the shipping date undefined into each process (S26). Note that, the processing of Step S25 suffices when the same processings as those of Steps S14 to S17 of FIG. 17 are performed for each lot of the record of the process stand-by state information table 215a in which the shipping date is not stored in the shipping date field 215e, and hence detailed description thereof is omitted.

Further, the second priority calculation module 235 stores the priority of each lot thus decided in the second priority information table, and stores the priority in the second priority information storage area 232.

Then, the output information generation module 225 generates the output information obtained by converting the information stored in the in-process information table 114a, the process stand-by state information table 215a, the under-transfer information table 116a, the first priority information table, and the second priority information table into the predetermined display format, and outputs the output information to the output unit 128 (S27).

Figure 23:
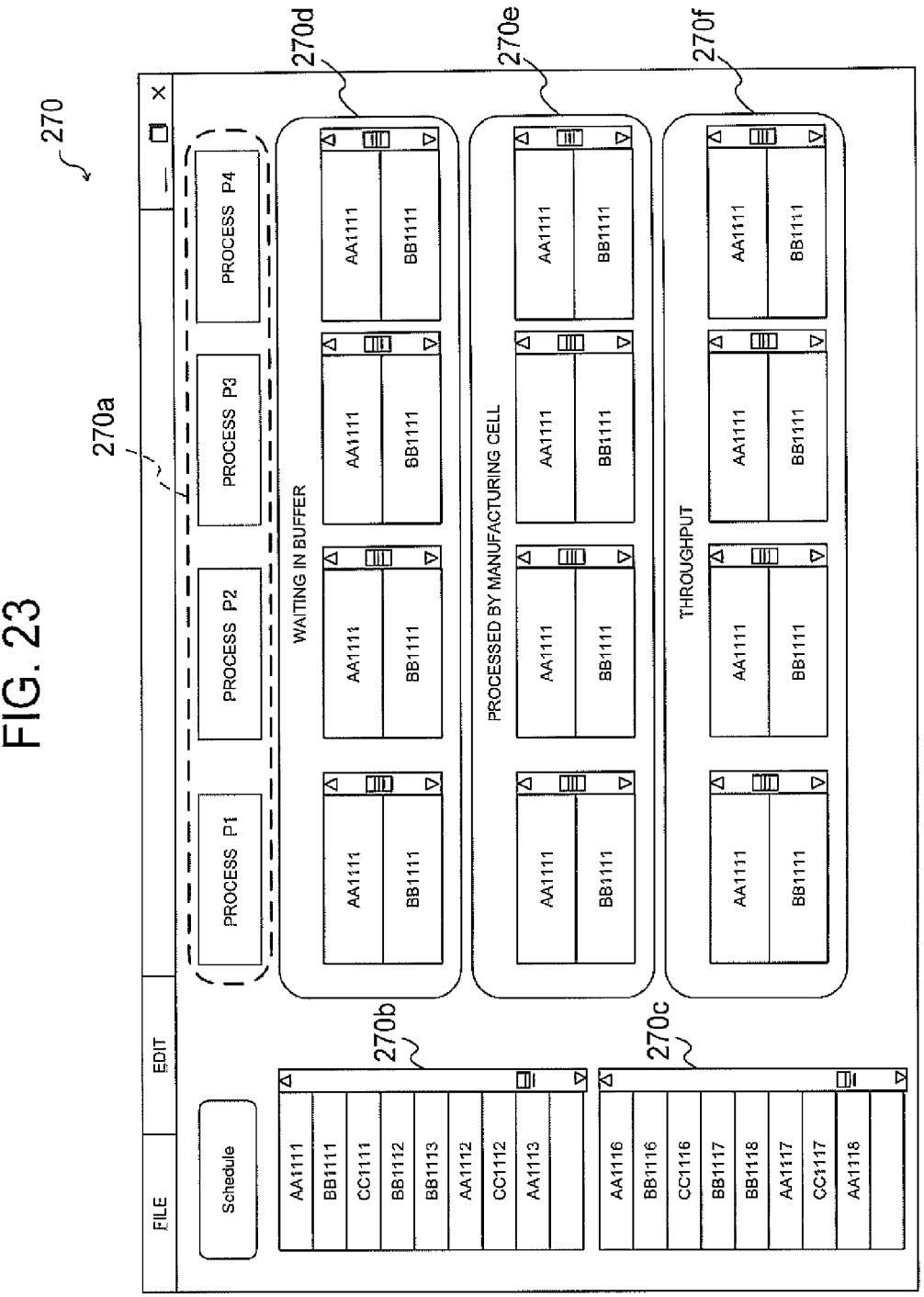
FIG. 23 A schematic diagram of an output screen.

Here, FIG. 23 is a schematic diagram of an output screen 270 that is an example of the output information generated by the output information generation module 125.

The output screen 270 has a process selection area 270a, a first lot precedence order display area 270b, a second lot precedence order display area 270c, a process stand-by state lot display area 270d, an in-process lot display area 270e, and a processed lot display area 270f.

Then, when an input of an execution instruction that selects a specific range including the process ID displayed in the process selection area 270a is performed on the output screen 270 displayed in the output unit 128 through the input unit 127, the output information generation module 225 displays the lot ID stored in the lot ID field of the first priority information table corresponding to the process determined by the selected process ID so that the lot associated with the higher priority determined by the priority field of the first priority information table is located in the higher position in the first lot precedence order display area 270b, further displays the lot ID stored in the lot ID field of the second priority information table corresponding to the process determined by the selected process ID so that the lot associated with the higher priority determined by the priority field of the second priority information table is located in the higher position in the first lot precedence order display area 270c, further displays in the process stand-by state lot display area 270d the lot ID stored in the lot ID field 215c of the process stand-by state information table 215a corresponding to the selected process, further displays in the in-process lot display area 270e the lot ID stored in the lot ID field 114c of the in-process information table 114a corresponding to the selected process, and further displays in the processed lot display area 270f the lot ID stored in the lot ID field 116c of the under-transfer information table 116a corresponding to the selected process.

Note that, the information corresponding to the first process in a manufacturing stage for the product is displayed before the input of the execution instruction that selects the specific range including the process ID displayed in the process selection area 270a is performed on the output screen 270 through the input unit 127.

The output screen 270 as described above is displayed on the output unit 128, and hence a manufacturer performing a processing in each process is able to preferentially manufacture the product whose order has already been received by introducing the lot associated with the highest priority displayed in the first lot precedence order display area 270b into the manufacturing device for the process.

Further, the priority calculated as described above can also be corrected due to various reasons and causes in the manufacturing line.

For example, in the case where the manufacturing device Q1 of the manufacturing line 160 illustrated in FIG. 3 is used by a plurality of processes such as a process P1 and a process P3, the process stand-by state information tables 115a and 215a of subsequent processes (process P2 and process P4) following after the processes (process P1 and process P3) are referenced, and if the numbers of parts included in the lots waiting to be introduced into the subsequent processes are equal to or smaller than a predetermined number, the priority of the lot including the numbers of parts equal to or smaller than the predetermined number can be defined in a manner that the higher priority is given to the lot.

Note that, as to the method of raising the priority in the above case, (an arbitrary number of) lots including the numbers of parts equal to or smaller than the predetermined number used for the product can be given the priority higher than the lot used for another product, or the priority defined by the above-mentioned method can be raised by a predetermined number.

Further, the priorities (the priority information table 119a, the first priority information table, and the second priority information table) calculated by the priority calculation devices 110 and 210 can be output to the manufacturing device used in each process so that the manufacturing device performs the processing for the lots in descending order of the priority. Further, an output device including a display or the like may be provided in a position close to the manufacturing device, and the output information generated by the output information generation module 125 may be output to the output device.

Further, the embodiments described above are described by using a certain product like a substrate (wafer) as an example. In the manufacturing process of the substrate, it is known that one substrate becomes one product. However, the present invention is not limited to such a mode. For example, with regard to the product manufactured by assembling a plurality of parts, product configuration information that constitute a parent-child relationship of the parts that constitute the product may be stored in advance, and the above-mentioned Euclidean distance $dd_i$ and Euclidean distance $sd_{ik}$ may be calculated in each process by assuming the number of parts to be assembled into one product as one unit and assuming the one unit as the quantity of the parts.

Further, in the second embodiment, the first priority calculation module 234 is caused to calculate the priority by the CR method, but the present invention is not limited to such a mode, and another method can be used to calculate the priority. In this case, if the method allows the priority to be calculated based on a supply date assigned to the lot, the present invention can be effectively combined therewith.

REFERENCE SIGNS LIST 100 priority calculation system
110 priority calculation device
111 storage unit
112 acquired information storage area
113 demand information storage area
114 in-process information storage area
115 process stand-by state information storage area
116 under-transfer information storage area
117 inventory item information storage area
118 improvement information storage area
119 priority information storage area
121 control unit
122 information acquisition module
123 information management module
124 priority calculation module
125 output information generation module
127 input unit
128 output unit
129 communication unit
130 manufacturing information providing device
140 shipment management device

The invention claimed is:

1. A priority calculation device which calculates a priority of each of lots to be introduced into a manufacturing stage, comprising:
   a storage unit which stores:
      demand information which determines a product type and a demand ratio of the product type during a predetermined period; and
      process stand-by state information which determines, for each of manufacturing stages, a lot waiting for a processing in the manufacturing stage, a product for which the lot is used, and a quantity of parts included in the lot; and
   a control unit,
   wherein the control unit is configured to perform, for each of the manufacturing stages, a processing for determining, from the process stand-by state information, the lot waiting for the processing in the manufacturing stage, the product type for which the lot is used, and the quantity of the parts included in the lot, and assigning the priority to each of the lots so that the lot for which a product-type-basis ratio of the parts included in a lot pending in the processing of the manufacturing stage and processings subsequent thereto, the product-type-basis ratio being obtained when the determined lot is introduced into the manufacturing stage, becomes closer to a product-type-basis demand ratio determined by the demand information is preferentially introduced into the manufacturing stage;
   wherein the control unit is further configured to:
   calculate, for each of the manufacturing stages, a first Euclidean distance between the product-type-basis ratio of the parts included in the lot pending in the processing of the manufacturing stage and the subsequent processings and the product-type-basis demand ratio determined by the demand information;
   determine, for each of the manufacturing stages, the lot waiting for the processing in the manufacturing stage, the product type for which the lot is used, and the quantity of the parts included in the lot from the process stand-by state information, and calculate, for each of the determined lots, a second Euclidean distance between the product-type-basis ratio of the parts included in the lot pending in the processing of the manufacturing stage and the subsequent processings, the product-type-basis ratio being obtained when the determined lot is introduced into the manufacturing stage, and the product-type-basis demand ratio determined by the demand information;
   calculate an improvement amount by which the first Euclidean distance is improved into the second Euclidean distance, for each of the lots in each of the manufacturing stages; and
   assign, in each of the manufacturing stages, the priority to each of the lots so that the lot having the larger improvement amount is preferentially introduced into the manufacturing stage.

2. A priority calculation device according to claim 1, wherein:
   the storage unit further stores:
      in-process information which determines, for each of the manufacturing stages, the lot which has been introduced into the manufacturing stage, the product for which the lot is used, and the quantity of the parts included in the lot;
      transfer information which determines, for each of the manufacturing stages, the lot under transfer to the manufacturing stage, the product for which the lot is used, and the quantity of the parts included in the lot; and
      inventory information which determines the product type and an inventory quantity of the product type; and
   the control unit is further configured to:
      extract, from the in-process information, the quantity of the parts included in the lot which has been introduced into the manufacturing stage in which the first Euclidean distance and the second Euclidean distance are calculated and manufacturing stages subsequent thereto;
      extract, from the treatment stand-by state information, the quantity of the parts included in the lot waiting in a manufacturing stage subsequent to the manufacturing stage in which the first Euclidean distance and the second Euclidean distance are calculated and manufacturing stages further subsequent thereto;

extract, from the transfer information, the quantity of the parts included in the lot transferred to the manufacturing stage subsequent to the manufacturing stage in which the first Euclidean distance and the second Euclidean distance are calculated and the further subsequent manufacturing stages;

extract, from the inventory information, the inventory quantity of each product type; and sum up the extracted quantities on a product type basis to thereby calculate the product-type-basis ratio of the parts included in the lot pending in the processing of the manufacturing stage in which the first Euclidean distance and the second Euclidean distance are calculated and the subsequent processings.

3. A priority calculation device which calculates a priority of each of lots to be introduced into a manufacturing stage, comprising:

a storage unit which stores:
demand information which determines a product type and a demand ratio of the product type during a pre-determined period; and process stand-by state information which determines, for each of manufacturing stages, a lot waiting for a processing in the manufacturing stage, a product for which the lot is used, and a quantity of parts included in the lot; and a control unit, wherein the control unit is configured to perform, for each of the manufacturing stages, a processing for determining, from the process stand-by state information, the lot waiting for the processing in the manufacturing stage, the product type for which the lot is used, and the quantity of the parts included in the lot, and assigning the priority to each of the lots so that the lot for which a product-type-basis ratio of the parts included in the lot pending in the processing of the manufacturing stage and processings subsequent thereto, the product-type-basis ratio being obtained when the determined lot is introduced into the manufacturing stage, becomes closer to a product-type-basis demand ratio determined by the demand information is preferentially introduced into the manufacturing stage;

wherein the control unit is further configured to perform a processing for calculating, by another method, the priority of the lot for which a shipping date is defined; and wherein the control unit is further configured to assign the priority to each of the lots having the shipping date defined so that the lot having a larger ratio of a remaining period until completion of the product to a remaining period until the shipping date is preferentially introduced into each of the manufacturing stages, for each of the lots.

4. A non-transitory computer-readable medium storing a program for causing a computer to function as a priority calculation device, which calculates a priority of each of lots to be introduced into a manufacturing stage, the program causing the computer to function as:

storage means which stores:
demand information which determines a product type and a demand ratio of the product type during a pre-determined period; and process stand-by state information which determines, for each of manufacturing stages, a lot waiting for a processing in the manufacturing stage, a product for which the lot is used, and a quantity of parts included in the lot; and control means, the program causing the control means to perform, for each of the manufacturing stages, a processing for determining, from the process stand-by state information, the lot waiting for the processing in the manufacturing stage, the product type for which the lot is used, and the quantity of the parts included in the lot, and assigning the priority to each of the lots so that the lot for which a product-type-basis ratio of the parts included in a lot pending in the processing of the manufacturing stage and processings subsequent thereto, the product-type-basis ratio being obtained when the determined lot is introduced into the manufacturing stage, becomes closer to a product-type-basis demand ratio determined by the demand information is preferentially introduced into the manufacturing stage;

calculate, for each of the manufacturing stages, a first Euclidean distance between the product-type-basis ratio of the parts included in the lot pending in the processing of the manufacturing stage and the subsequent processings and the product-type-basis demand ratio determined by the demand information;

determine, for each of the manufacturing stages, the lot waiting for the processing in the manufacturing stage, the product type for which the lot is used, and the quantity of the parts included in the lot from the process stand-by state information, and calculate, for each of the determined lots, a second Euclidean distance between the product-type-basis ratio of the parts included in the lot pending in the processing of the manufacturing stage and the subsequent processings, the product-type-basis ratio being obtained when the determined lot is introduced into the manufacturing stage, and the product-type-basis demand ratio determined by the demand information;

calculate an improvement amount by which the first Euclidean distance is improved into the second Euclidean distance, for each of the lots in each of the manufacturing stages; and assign, in each of the manufacturing stages, the priority to each of the lots so that the lot having the larger improvement amount is preferentially introduced into the manufacturing stage.

5. A non-transitory computer-readable medium according to claim 4, wherein:

the storage means further stores:
in-process information which determines, for each of the manufacturing stages, the lot which has been introduced into the manufacturing stage, the product for which the lot is used, and the quantity of the parts included in the lot;

transfer information which determines, for each of the manufacturing stages, the lot under transfer to the manufacturing stage, the product for which the lot is used, and the quantity of the parts included in the lot; and inventory information which determines the product type and an inventory quantity of the product type; and the program further causes the control means to:
extract, from the in-process information, the quantity of the parts included in the lot which has been introduced into the manufacturing stage in which the first Euclidean distance and the second Euclidean distance are calculated and manufacturing stages subsequent thereto;

extract, from the treatment stand-by state information, the quantity of the parts included in the lot waiting in a manufacturing stage subsequent to the manufacturing stage in which the first Euclidean distance and the second Euclidean distance are calculated and manufacturing stages further subsequent thereto;

extract, from the transfer information, the quantity of the parts included in the lot transferred to the manufacturing stage subsequent to the manufacturing stage in which the first Euclidean distance and the second Euclidean distance are calculated and the further subsequent manufacturing stages;

extract, from the inventory information, the inventory quantity of each product type; and sum up the extracted quantities on a product type basis to thereby calculate the product-type-basis ratio of the parts included in the lot pending in the processing of the manufacturing stage in which the first Euclidean distance and the second Euclidean distance are calculated and the subsequent processings.

6. A non-transitory computer-readable medium storing a program for causing a computer to function as a priority calculation device, which calculates a priority of each of lots to be introduced into a manufacturing stage, the program causing the computer to function as:

storage means which stores:

demand information which determines a product type and a demand ratio of the product type during a predetermined period; and process stand-by state information which determines, for each of manufacturing stages, a lot waiting for a processing in the manufacturing stage, a product for which the lot is used, and a quantity of parts included in the lot; and control means, the program causing the control means to perform, for each of the manufacturing stages, a processing for determining, from the process stand-by state information, the lot waiting for the processing in the manufacturing stage, the product type for which the lot is used, and the quantity of the parts included in the lot, and assigning the priority to each of the lots so that the lot for which a product-type-basis ratio of the parts included in a lot pending in the processing of the manufacturing stage and processings subsequent thereto, the product-type-basis ratio being obtained when the determined lot is introduced into the manufacturing stage, becomes closer to a product-type-basis demand ratio determined by the demand information is preferentially introduced into the manufacturing stage;

causing the control means to perform a processing for calculating, by another method, the priority of the lot for which a shipping date is defined; and causing the control means to assign the priority to each of the lots having the shipping date defined so that the lot having a larger ratio of a remaining period until completion of the product to a remaining period until the shipping date is preferentially introduced into each of the manufacturing stages, for each of the lots.

7. A priority calculation system comprising:

a shipment management device;

a manufacturing information providing device; and a priority calculation device, wherein:

the shipment management device performs a processing for outputting, to the priority calculation device, supply information which determines a product type and a demanded quantity of the product type during a predetermined period;

the manufacturing information providing device is configured to perform, for each of manufacturing stages, a processing for outputting, to the priority calculation device, carry-in information which determines a lot waiting for a processing in the manufacturing stage, a product for which the lot is used, and a quantity of parts included in the lot; and a control unit of the priority calculation device is configured to:

perform a processing for generating, from the supply information acquired from the shipment management device, demand information which determines the product type and a demand ratio of the product type during the predetermined period, and storing the demand information in a storage unit;

perform a processing for generating, from the carry-in information acquired from the manufacturing information providing device, process stand-by state information which determines, for each of the manufacturing stages, the lot, the product for which the lot is used, and the quantity of the parts included in the lot, and storing the process stand-by state information in the storage unit; and perform, for each of the manufacturing stages, a processing for determining, from the process stand-by state information, the lot waiting for the processing in the manufacturing stage, the product type for which the lot is used, and the quantity of the parts included in the lot, and assigning the priority to each of lots so that the lot for which a product-type-basis ratio of the parts included in a lot pending in the processing of the manufacturing stage and processings subsequent thereto, the product-type-basis ratio being obtained when the determined lot is introduced into the manufacturing stage, becomes closer to a product-type-basis demand ratio determined by the demand information is preferentially introduced into the manufacturing stage;

wherein the control unit of the priority calculation device is further configured to:

calculate, for each of the manufacturing stages, a first Euclidean distance between the product-type-basis ratio of the parts included in the lot pending in the processing of the manufacturing stage and the subsequent processings and the product-type-basis demand ratio determined by the demand information;

determine, for each of the manufacturing stages, the lot waiting for the processing in the manufacturing stage, the product type for which the lot is used, and the quantity of the parts included in the lot from the process stand-by state information, and calculate, for each of the determined lots, a second Euclidean distance between the product-type-basis ratio of the parts included in the lot pending in the processing of the manufacturing stage and the subsequent processings, the product-type-basis ratio being obtained when the determined lot is introduced into the manufacturing stage, and the product-type-basis demand ratio determined by the demand information;

calculate an improvement amount by which the first Euclidean distance is improved into the second Euclidean distance, for each of the lots in each of the manufacturing stages; and assign, in each of the manufacturing stages, the priority to each of the lots so that the lot having the larger improvement amount is preferentially introduced into the manufacturing stage.

8. A priority calculation system according to claim 7, wherein:

the carry-in information includes information which determines, for each of the manufacturing stages, the lot being moved to the subsequent manufacturing stage, the product for which the lot is used, and the quantity of the parts included in the lot;

the manufacturing information providing device is further configured to perform a processing for outputting, to the priority calculation device:

process information which determines, for each of the manufacturing stages, the lot which has been introduced into the manufacturing stage, the product for which the lot is used, and the quantity of the parts included in the lot; and inventory information which determines the product type and an inventory quantity of the product type;

the control unit of the priority calculation device is further configured to perform processings for:

generating, from the process information acquired from the manufacturing information providing device, in-process information which determines, for each of the manufacturing stages, the lot which has been introduced into the manufacturing stage, the product for which the lot is used, and the quantity of the parts included in the lot, and storing the in-process information in the storage unit;

generating, from the carry-in information acquired from the manufacturing information providing device, transfer information which determines, for each of the manufacturing stages, the lot under transfer to the manufacturing stage, the product for which the lot is used, and the quantity of the parts included in the lot, and storing the transfer information in the storage unit; and generating, from the inventory information acquired from the manufacturing information providing device, the inventory information which determines the product type and the inventory quantity of the product type, and storing the inventory information in the storage unit; and the control unit of the priority calculation device is further configured to:

extract, from the in-process information, the quantity of the parts included in the lot which has been introduced into the manufacturing stage in which the first Euclidean distance and the second Euclidean distance are calculated and manufacturing stages subsequent thereto;

extract, from the treatment stand-by state information, the quantity of the parts included in the lot waiting in a manufacturing stage subsequent to the manufacturing stage in which the first Euclidean distance and the second Euclidean distance are calculated and manufacturing stages further subsequent thereto;

extract, from the transfer information, the quantity of the parts included in the lot transferred to the manufacturing stage subsequent to the manufacturing stage in which the first Euclidean distance and the second Euclidean distance are calculated and the further subsequent manufacturing stages;

extract, from the inventory information, the inventory quantity of each product type; and sum up the extracted quantities on a product type basis to thereby calculate the product-type-basis ratio of the parts included in the lot pending in the processing of the manufacturing stage in which the first Euclidean distance and the second Euclidean distance are calculated and processings subsequent thereto.

9. A priority calculation system according to claim 7, wherein the control unit of the priority calculation device is further configured to perform, for each of the manufacturing stages, a processing for outputting output information to an output unit, the output information being obtained by arranging information items which determine the lots according to the priorities assigned thereto.

10. A priority calculation system according to claim 7, wherein the control unit of the priority calculation device is further configured to perform a processing for calculating, by another method, the priority of the lot for which a shipping date is defined.

11. A priority calculation system according to claim 10, wherein the control unit of the priority calculation device is further configured to assign the priority to each of the lots having the shipping date defined so that the lot having a larger ratio of a remaining period until completion of the product to a remaining period until the shipping date is preferentially introduced into each of the manufacturing stages, for each of the lots.

* * * * *